(12) United States Patent
Hu et al.

(10) Patent No.: US 12,363,772 B2
(45) Date of Patent: Jul. 15, 2025

(54) DATA TRANSMISSION METHOD, DEVICE, AND SYSTEM

(71) Applicant: Huawei Technologies Co., Ltd., Shenzhen (CN)

(72) Inventors: Yong Hu, Shenzhen (CN); Qi Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 18/170,736

(22) Filed: Feb. 17, 2023

(65) Prior Publication Data

US 2023/0209655 A1 Jun. 29, 2023

Related U.S. Application Data

(63) Continuation of application No. 16/804,515, filed on Feb. 28, 2020, now Pat. No. 11,612,013, which is a (Continued)

(30) Foreign Application Priority Data

Aug. 29, 2017 (CN) .......................... 201710758372.4
Aug. 7, 2018 (CN) .......................... 201810890123.5

(51) Int. Cl.
*H04W 76/12* (2018.01)
*H04W 60/00* (2009.01)
(Continued)

(52) U.S. Cl.
CPC ........... *H04W 76/12* (2018.02); *H04W 60/00* (2013.01); *H04W 76/11* (2018.02); *H04W 80/10* (2013.01); *H04W 84/12* (2013.01)

(58) Field of Classification Search
None
See application file for complete search history.

(56) References Cited

U.S. PATENT DOCUMENTS

| 2012/0143982 | A1 | 6/2012 | Oster et al. |
| 2012/0177052 | A1* | 7/2012 | Chen ............... H04W 40/36 370/392 |

(Continued)

FOREIGN PATENT DOCUMENTS

| CN | 101009907 A | 8/2007 |
| CN | 101808361 A | 8/2010 |

(Continued)

OTHER PUBLICATIONS

"3rd Generation Partnership Project; Technical Specification Group Core Network and Terminals; 5G System—Phase 1; CT WG4 Aspects (Release 15)," 3GPP TR 29.891 V0.3.0, May 2017, 80 pages.

(Continued)

*Primary Examiner* — Adnan Baig
(74) *Attorney, Agent, or Firm* — Conley Rose, P.C.

(57) ABSTRACT

A data transmission method includes receiving, by a user plane function entity, a data packet from a first terminal through an uplink path corresponding to the first terminal, where the data packet carries addressing information of a second terminal; determining, by the user plane function entity based on information about the uplink path corresponding to the first terminal and the addressing information of the second terminal, a downlink path corresponding to the second terminal; and sending, by the user plane function entity, the data packet to the second terminal through the downlink path corresponding to the second terminal.

22 Claims, 14 Drawing Sheets

Related U.S. Application Data continuation of application No. PCT/CN2018/101465, filed on Aug. 21, 2018.

(51) Int. Cl.
*H04W 76/11* (2018.01)
*H04W 80/10* (2009.01)
*H04W 84/12* (2009.01)

(56) References Cited

U.S. PATENT DOCUMENTS

| | | | |
|---|---|---|---|
| 2017/0208634 A1 | 7/2017 | Bharatia et al. | |
| 2018/0103495 A1 | 4/2018 | Kim et al. | |
| 2018/0115928 A1* | 4/2018 | Kim | H04W 36/0061 |
| 2018/0146362 A1 | 5/2018 | Hou et al. | |
| 2018/0262424 A1* | 9/2018 | Roeland | H04L 41/0896 |
| 2018/0278729 A1 | 9/2018 | Sugaya et al. | |
| 2019/0124580 A1* | 4/2019 | Lu | H04W 76/12 |
| 2019/0166647 A1 | 5/2019 | Velev et al. | |
| 2019/0364541 A1* | 11/2019 | Ryu | H04W 80/10 |
| 2020/0213894 A1* | 7/2020 | Agiwal | H04W 76/11 |
| 2021/0153111 A1 | 5/2021 | Theimer et al. | |

FOREIGN PATENT DOCUMENTS

| | | |
|---|---|---|
| CN | 102265635 A | 11/2011 |
| CN | 102594818 A | 7/2012 |
| CN | 105163285 A | 12/2015 |
| CN | 106102106 A | 11/2016 |
| CN | 106230749 A | 12/2016 |
| CN | 106900081 A | 6/2017 |
| CN | 107018542 A | 8/2017 |
| EP | 1351450 A2 | 10/2003 |
| KR | 20080002089 A | 1/2008 |
| WO | 2012167480 A1 | 12/2012 |
| WO | 2016130058 A1 | 8/2016 |
| WO | 2017081903 A1 | 5/2017 |

OTHER PUBLICATIONS

3rd Generation Partnership Project; Technical Specification Group Services and System Aspects; System Architecture for the 5G System; Stage 2 (Release 15), 3GPP TS 23.501 V1.2.0, Jul. 2017, 166 pages.

"3rd Generation Partnership Project; Technical Specification Group Services and System Aspects; Procedures for the 5G System; Stage 2 (Release 15)," 3GPP TS 23.502 V0.6.0, Aug. 17, 2017, 148 pages.

"3rd Generation Partnership Project; Technical Specification Group Core Network and Terminals; Interface between the Control Plane and the User Plane of EPC Nodes; Stage 3 (Release 14)," 3GPP TS 29.244 V14.0.0, Jun. 2017, 137 pages.

XP014308632, Huawei Technologies Co Ltd., "Mobile LAN: A Cellular Network-based Dynamic Local Area Network," Feb. 13, 2017, 10 pages.

Intel, ZTE, "Clarification on usage of an UL Classifier," 3GPP TSG SA WG2#122BIS, S2-176474, Aug. 21-25, 2017, 8 pages.

Intel, "23. 502: Service continuity call flows," 3GPP TSG SA WG2#119 S2-171492, Feb. 13-17, 2017, 8 pages.

Nokia, Alcatel-Lucent Shanghai Bell, "23. 502: SUPI terminology correction," 3GPP TSG SA WG2#122BIS S2-175965, Aug. 21-25, 2017, 26 pages.

"DHCP (r57 edition)," with an English machine translation, Aug. 24, 2017, 12 pages.

Huawei, HiSilicon, "Uplink data transmission over WLAN for LWA," 3GPPTSG-RAN WG2#93bis, R2-162531, Apr. 2016, 4 pages.

Xinwei, "Data routing issues between UE and WT for uplink transmission in WLAN side," 3GPP TSG-RAN WG2#93bis, R2-162261, Apr. 2016, 4 pages.

Telecom Italia, KPN, TeliaSonera, "Flexible Up security termination," 3GPP TSG SA WG3#86b, S3-170942, Mar. 2017, 10 pages.

Huawei, Hisilicon, "5WWC High level requirements," 3GPP TSG SA WG2#122BIS, S2-175625, Aug. 2017, 5 pages.

Motorola Mobility, Lenovo, Broadcom, "Transport mode vs. Tunnel mode," 3GPP TSG SA WG2#119, S2-171274, Feb. 2017, 8 pages.

Ericsson, "Updates and resolving FFS on IP address management," 3GPP TSG SA WG2#122BIS, S2-176429, Aug. 2017, 4 pages. 1.

ETSI TS 123 214 V14.3.0, Jul. 2017, "Universal Mobile Telecommunications System (UMTS); LTE; Architecture enhancements for control and user plane separation of EPC nodes (3GPP TS 23.214 version 14.3.0 Release 14)," 83 pages.

3GPP TS 23.203 V14.4.0, Jun. 2017, "3rd Generation Partnership Project; Technical Specification Group Services and System Aspects; Policy and charging control architecture (Release 14)," 257 pages.

\* cited by examiner

DATA TRANSMISSION METHOD, DEVICE, AND SYSTEM

CROSS-REFERENCE TO RELATED APPLICATIONS

This is a continuation of U.S. patent app. Ser. No. 16/804,515 filed on Feb. 28, 2020, which is a continuation of Int'L Patent App. No. PCT/CN2018/101465 filed on Aug. 21, 2018, which claims priority to Chinese Patent App. No. 201710758372.4 filed on Aug. 29, 2017, and Chinese Patent App. No. 20181,0890123.5 filed on Aug. 7, 2018, all of which are incorporated by reference.

FIELD

This application relates to the field of communications technologies, and in particular, to a data transmission method, a device, and a system.

BACKGROUND

A local area network (LAN) is a computer communications network that interconnects various computers, external devices, and databases within a local geographical range, for example, a school, a factory, or an institution. The local area network may be connected to a remote local area network, database, or processing center by using a data communication network or a dedicated data circuit, to construct a large-scale information processing system. With emergence of a new enterprise office mode and a smart home mode, a wired LAN and a wireless LAN (WLAN) expose shortcomings in aspects such as complex deployment, flexibility, mobility, and coverage. This encourages further development of a LAN technology, to adapt to requirements of future applications for the LAN.

A network that directly provides a LAN service by utilizing a wide coverage characteristic of a mobile network is referred to as a mobile local area network (MLAN). The MLAN may be used within a more extensive mobile network coverage area. In other words, even if users are located in a same area, the users can implement LAN-based data exchange or communication provided that they access a same MLAN. A mobile network with wide coverage is utilized, so that creating, expansion, migration, and adjustment of the MLAN can be automatically completed by using the mobile network without manual intervention. In addition, an MLAN may be customized according to a requirement, and different MLANs are securely isolated with each other.

However, in the MLAN, when two terminals correspond to a same user plane function (UPF) entity, there is currently no related solution for how the two terminals locally interact with each other.

SUMMARY

Embodiments of this application provide a data transmission method, a device, and a system, so that when two terminals correspond to a same UPF entity, the two terminals can locally interact with each other.

To achieve the foregoing objective, the embodiments of this application provide the following technical solutions.

According to a first aspect, a data transmission method is provided, and the method includes: receiving, by a user plane function entity, a data packet from a first terminal through an uplink path corresponding to the first terminal, where the data packet carries addressing information of a second terminal; determining, by the user plane function entity based on information about the uplink path corresponding to the first terminal and the addressing information of the second terminal, a downlink path corresponding to the second terminal; and sending, by the user plane function entity, the data packet to the second terminal through the downlink path corresponding to the second terminal. Based on this solution, after receiving the data packet from the first terminal through the uplink path corresponding to the first terminal, the user plane function entity can determine, based on the information about the uplink path corresponding to the first terminal and the addressing information of the second terminal, the downlink path corresponding to the second terminal, and can further send the data packet to the second terminal through the downlink path corresponding to the second terminal. Therefore, when two terminals correspond to a same user plane function entity, the two terminals can locally interact with each other.

In a possible design, the determining, by the user plane function entity based on information about the uplink path corresponding to the first terminal and the addressing information of the second terminal, a downlink path corresponding to the second terminal includes: determining, by the user plane function entity based on the information about the uplink path corresponding to the first terminal, an identifier of a mobile local area network MLAN to which the first terminal subscribes; and determining, by the user plane function entity based on the identifier of the MLAN and the addressing information of the second terminal, the downlink path corresponding to the second terminal. Based on this solution, the downlink path corresponding to the second terminal can be determined in the MLAN.

In a possible design, the determining, by the user plane function entity based on the information about the uplink path corresponding to the first terminal, an identifier of an MLAN to which the first terminal subscribes includes: determining, by the user plane function entity based on the information about the uplink path corresponding to the first terminal and a first correspondence, the identifier of the MLAN to which the first terminal subscribes, where the first correspondence includes a correspondence between the information about the uplink path corresponding to the first terminal and the identifier of the MLAN. Based on this solution, the identifier of the MLAN to which the first terminal subscribes can be determined.

In a possible design, the determining, by the user plane function entity based on the identifier of the MLAN and the addressing information of the second terminal, the downlink path corresponding to the second terminal includes: determining, by the user plane function entity based on the identifier of the MLAN, the addressing information of the second terminal, and a second correspondence, the downlink path corresponding to the second terminal, where the second correspondence includes a correspondence between information about the downlink path corresponding to the second terminal, the addressing information of the second terminal, and the identifier of the MLAN. Based on this solution, the downlink path corresponding to the second terminal can be determined in the MLAN.

In a possible design, the method further includes: obtaining, by the user plane function entity, the addressing information of the second terminal, where the addressing information of the second terminal includes an internet protocol IP address of the second terminal or a media access control MAC address of the second terminal. Based on this solution, the user plane function entity can obtain the addressing information of the second terminal.

In a possible design, the addressing information of the second terminal includes the IP address of the second terminal; and the obtaining, by the user plane function entity, the addressing information of the second terminal includes: receiving, by the user plane function entity, the IP address of the second terminal from a session management function entity, where the IP address of the second terminal is determined based on the identifier of the MLAN. Based on this solution, the user plane function entity can obtain the IP address of the second terminal.

In a possible design, the addressing information of the second terminal includes the MAC address of the second terminal; and the obtaining, by the user plane function entity, the addressing information of the second terminal includes: receiving, by the user plane function entity, the MAC address of the second terminal from the second terminal during an MLAN session establishment process. Based on this solution, the user plane function entity can obtain the MAC address of the second terminal.

In a possible design, the addressing information of the second terminal includes the MAC address of the second terminal; and the obtaining, by the user plane function entity, the addressing information of the second terminal includes: receiving, by the user plane function entity, a dynamic host configuration protocol DHCP request from the second terminal through an uplink path of the second terminal, where the DHCP request carries the MAC address of the second terminal; sending, by the user plane function entity, the DHCP request to a session management function entity; and receiving, by the user plane function entity, the MAC address of the second terminal from the session management function entity. Based on this solution, the user plane function entity can obtain the MAC address of the second terminal.

In a possible design, the addressing information of the second terminal includes the MAC address of the second terminal; and the obtaining, by the user plane function entity, the addressing information of the second terminal includes: receiving, by the user plane function entity, a DHCP request from the second terminal through an uplink path of the second terminal, where the DHCP request carries the MAC address of the second terminal; and parsing, by the user plane function entity, the DHCP request, to obtain the MAC address of the second terminal. Based on this solution, the user plane function entity can obtain the MAC address of the second terminal.

In a possible design, the method further includes: obtaining, by the user plane function entity, the identifier of the MLAN to which the second terminal subscribes and the information about the downlink path corresponding to the second terminal; and establishing, by the user plane function entity, the second correspondence based on the identifier of the MLAN, the addressing information of the second terminal, and the information about the downlink path corresponding to the second terminal. Based on this solution, the user plane function entity can establish the second correspondence.

In a possible design, before the receiving, by the user plane function entity, a DHCP request from the second terminal through an uplink path of the second terminal, the method further includes: obtaining, by the user plane function entity, information about the uplink path corresponding to the second terminal, the identifier of the MLAN to which the second terminal subscribes, and the information about the downlink path corresponding to the second terminal; and establishing, by the user plane function entity, a third correspondence based on the information about the uplink path corresponding to the second terminal, the information about the downlink path corresponding to the second terminal, and the identifier of the MLAN, where the third correspondence includes a correspondence between the information about the uplink path corresponding to the second terminal, the information about the downlink path corresponding to the second terminal, and the identifier of the MLAN; and after the receiving, by the user plane function entity, a DHCP request from the second terminal through an uplink path corresponding to the second terminal, the method further includes: establishing, by the user plane function entity, the second correspondence based on the third correspondence and the MAC address of the second terminal. Based on this solution, the user plane function entity can establish the second correspondence.

In a possible design, the method further includes: obtaining, by the user plane function entity, the identifier of the MLAN to which the first terminal subscribes and the information about the uplink path corresponding to the first terminal; and establishing, by the user plane function entity, the first correspondence based on the identifier of the MLAN and the information about the uplink path corresponding to the first terminal. Based on this solution, the user plane function entity can establish the first correspondence.

In a possible design, the information about the uplink path corresponding to the first terminal includes a tunnel identifier of the user plane function entity that is allocated for the first terminal; and the information about the downlink path corresponding to the second terminal includes a tunnel identifier of an access device that is allocated for the second terminal.

According to a second aspect, a user plane function entity is provided, and the user plane function entity has a function of implementing the method in the first aspect. The function may be implemented by hardware, or may be implemented by executing corresponding software by hardware. The hardware or software includes one or more modules that correspond to the foregoing function.

According to a third aspect, a user plane function entity is provided, and includes: a processor and a memory, where the memory is configured to store a computer execution instruction, and when the user plane function entity runs, the processor executes the computer execution instruction stored in the memory, so that the user plane function entity is enabled to perform the data transmission method in any one of the first aspect or the possible designs of the first aspect.

According to a fourth aspect, a computer-readable storage medium is provided, the computer-readable storage medium stores an instruction, and when the instruction is run on a computer, the computer is enabled to perform the data transmission method in any one of the first aspect or the possible designs of the first aspect.

According to a fifth aspect, a computer program product including an instruction is provided. When the computer program product is run on a computer, the computer is enabled to perform the data transmission method in any one of the first aspect or the possible designs of the first aspect.

According to a sixth aspect, a chip system is provided. The chip system includes a processor, where the processor is configured to support a user plane function entity in implementing the functions in the foregoing aspects, for example, determining, based on information about an uplink path corresponding to a first terminal and addressing information of a second terminal, a downlink path corresponding to the second terminal. In a possible design, the chip system further includes a memory, where the memory is configured to store a program instruction and data that are necessary for a user plane function entity. The chip system may include a chip, or may include a chip and another discrete device.

For technical effects brought in by any design manner in the second aspect to the sixth aspect, refer to technical effects brought in by different design manners in the first aspect. Details are not described herein again.

According to a seventh aspect, a mobility management entity is provided. The mobility management entity includes a transceiver module and a processing module, where the transceiver module is configured to receive a registration or re-registration request from a terminal; the processing module is configured to obtain, from a database entity, an identifier of a mobile local area network MLAN to which the terminal subscribes; and the transceiver module is further configured to send the identifier of the MLAN to the terminal. Based on this solution, the identifier of the MLAN to which the terminal subscribes can be configured on the terminal.

In a possible design, the identifier of the MLAN is an identifier corresponding to a specific area; and the transceiver module is further configured to: when the processing module determines that a current registration area of the terminal overlaps the specific area, send the identifier of the MLAN to the terminal.

In a possible design, the transceiver module is further configured to receive the identifier of the MLAN from the terminal during an MLAN session establishment process, where the identifier of the MLAN is used to establish an MLAN session.

According to an eighth aspect, a data transmission system is provided. The data transmission system includes the user plane function entity in any one of the foregoing aspects and the mobility management entity in any one of the foregoing aspects.

According to a ninth aspect, a data transmission method is provided. The data transmission method includes: obtaining, by a session management network element, an identifier of a mobile local area network MLAN associated with a session of a terminal; determining, by the session management network element, an uplink data forwarding rule based on the identifier of the MLAN, where the uplink data forwarding rule includes a label of the MLAN and information about an uplink path corresponding to the session; and sending, by the session management network element, the uplink data forwarding rule to a user plane network element, where the uplink data forwarding rule is used to instruct the user plane network element to forward, by using routing information corresponding to the label of the MLAN, uplink data received on the uplink path. Based on this solution, the session management network element can determine the uplink data forwarding rule based on the identifier of the MLAN, and send the uplink data forwarding rule to the user plane network element, and the uplink data forwarding rule is used to instruct the user plane network element to forward, by using the routing information corresponding to the label of the MLAN, the uplink data received on the uplink path. Therefore, when two terminals correspond to a same user plane function network element, the two terminals can locally interact with each other.

In a possible design, the obtaining, by a session management network element, an identifier of an MLAN associated with a session of a terminal is: receiving, by the session management network element, a session establishment request from the terminal, where the session establishment request includes the identifier of the MLAN; or receiving, by the session management network element, a request message from a mobility management network element, where the request message includes the identifier of the MLAN. Based on this solution, the session management network element can obtain the identifier of the MLAN associated with the session for the terminal.

In a possible design, the determining, by the session management network element, an uplink data forwarding rule based on the identifier of the MLAN is: obtaining, by the session management network element, the label of the MLAN based on the identifier of the MLAN; and generating, by the session management network element, the uplink data forwarding rule based on the label of the MLAN and the information that is about the uplink path corresponding to the session and that is allocated for the terminal. Based on this solution, the session management network element can determine the uplink data forwarding rule.

In a possible design, the obtaining, by the session management network element, the label of the MLAN based on the identifier of the MLAN is: obtaining, by the session management network element, subscription data of the MLAN of the terminal based on the identifier of the MLAN, where the subscription data includes the label of the MLAN; or obtaining, by the session management network element, authentication data of the MLAN of the terminal based on the identifier of the MLAN, where the authentication data includes the label of the MLAN; or allocating, by the session management network element, the label of the MLAN for the session based on the identifier of the MLAN; or determining, by the session management network element, the identifier of the MLAN as the label of the MLAN. Based on this solution, the session management network element can obtain the label of the MLAN.

In a possible design, the data transmission method provided in this embodiment of this application further includes: obtaining, by the session management network element, a downlink data forwarding rule, where the downlink data forwarding rule includes the label of the MLAN and addressing information of the terminal; and sending, by the session management network element, the downlink data forwarding rule to the user plane network element, where the downlink data forwarding rule is used to instruct the user plane network element to forward, by using the routing information corresponding to the label of the MLAN, downlink data to be sent to an address corresponding to the addressing information of the terminal. Based on this solution, the session management network element can obtain the downlink data forwarding rule, and send the downlink data forwarding rule to the user plane network element, and the downlink data forwarding rule is used to instruct the user plane network element to forward, by using the routing information corresponding to the label of the MLAN, the downlink data to be sent to the address corresponding to the addressing information of the terminal. Therefore, when two terminals correspond to a same user plane function network element, the two terminals can locally interact with each other.

In a possible design, the data transmission method provided in this embodiment of this application further includes: obtaining, by the session management network element, a downlink data forwarding rule, where the downlink data forwarding rule includes the label of the MLAN, addressing information of the terminal, and information about a downlink path corresponding to the session; and sending, by the session management network element, the downlink data forwarding rule to the user plane network element, where the downlink data forwarding rule is used to instruct the user plane network element to update the routing information corresponding to the label of the MLAN, and forward, by using the downlink path in updated routing information corresponding to the label of the MLAN, downlink data to be sent to an address corresponding to the addressing information of the terminal. Based on this solution, the session management network element can obtain the downlink data forwarding rule, and send the downlink data forwarding rule to the user plane network element, and the downlink data forwarding rule is used to instruct the user plane network element to update the routing information corresponding to the label of the MLAN, and forward, by using the downlink path in the updated routing information corresponding to the label of the MLAN, the downlink data to be sent to an address corresponding to the addressing information of the terminal. Therefore, when two terminals correspond to a same user plane function network element, the two terminals can locally interact with each other.

According to a tenth aspect, a session management network element is provided, and the session management network element has a function of implementing the method in the ninth aspect. The function may be implemented by hardware, or may be implemented by executing corresponding software by hardware. The hardware or software includes one or more modules corresponding to the foregoing function.

According to an eleventh aspect, a session management network element is provided, and includes: a processor and a memory, where the memory is configured to store a computer execution instruction, and when the session management network element runs, the processor executes the computer execution instruction stored in the memory, so that the session management network element is enabled to perform the data transmission method in any one of the ninth aspect or the possible designs of the ninth aspect.

According to twelfth aspect, a session management network element is provided, and includes a processor. The processor is configured to couple to a memory, and configured to read an instruction in the memory and perform the data transmission method in any one of the ninth aspect or the possible designs of the ninth aspect according to the instruction.

According to a thirteenth aspect, a computer-readable storage medium is provided, where the computer-readable storage medium stores an instruction, and when the instruction is run on a computer, the computer is enabled to perform the data transmission method in any one of the ninth aspect or the possible designs of the ninth aspect.

According to a fourteenth aspect, a computer program product including an instruction is provided. When the computer program product is run on a computer, the computer is enabled to perform the data transmission method in any one of the ninth aspect or the possible designs of the ninth aspect.

According to a fifteenth aspect, a chip system is provided, where the chip system includes a processor, and the processor is configured to support a session management network element in implementing the functions in the foregoing aspects, for example, obtaining an identifier of an MLAN associated with a session of a terminal, and determining an uplink data forwarding rule based on the identifier of the MLAN. In a possible design, the chip system further includes a memory, and the memory is configured to store a program instruction and data that are necessary for a session management network element. The chip system may include a chip, or may include a chip and another discrete device.

For technical effects brought in by any design manner in the tenth aspect to the fifteenth aspect, refer to technical effects brought in by different design manners in the ninth aspect. Details are not described herein again.

According to a sixteenth aspect, a data transmission system is provided. The data transmission system includes: a session management network element and a user plane network element, where the session management network element is configured to obtain an identifier of a mobile local area network MLAN associated with a session of a terminal; the session management network element is further configured to determine an uplink data forwarding rule based on the identifier of the MLAN, where the uplink data forwarding rule includes a label of the MLAN and information about an uplink path corresponding to the session; the session management network element is further configured to send the uplink data forwarding rule to the user plane network element, where the uplink data forwarding rule is used to instruct the user plane network element to forward, by using routing information corresponding to the label of the MLAN, uplink data received on the uplink path; and the user plane network element is configured to receive the uplink data forwarding rule from the session management network element.

In a possible design, the user plane network element is further configured to forward, based on the uplink data forwarding rule by using routing information corresponding to the label of the MLAN, uplink data received on the uplink path.

In a possible design, the session management network element is further configured to obtain a downlink data forwarding rule, where the downlink data forwarding rule includes the label of the MLAN and addressing information of the terminal; the session management network element is further configured to send the downlink data forwarding rule to the user plane network element, where the downlink data forwarding rule is used to instruct the user plane network element to forward, by using the routing information corresponding to the label of the MLAN, downlink data to be sent to an address corresponding to the addressing information of the terminal; and the user plane network element is further configured to receive the downlink data forwarding rule from the session management network element, and forward, based on the downlink data forwarding rule by using the routing information corresponding to the label of the MLAN, the downlink data to be sent to the address corresponding to the addressing information of the terminal.

In a possible design, the session management network element is further configured to obtain a downlink data forwarding rule, where the downlink data forwarding rule includes the label of the MLAN, addressing information of the terminal, and information about a downlink path corresponding to the session; the session management network element is further configured to send the downlink data forwarding rule to the user plane network element, where the downlink data forwarding rule is used to instruct to update the routing information corresponding to the label of the MLAN, and enable the user plane network element to forward, by using the downlink path in updated routing information corresponding to the label of the MLAN, downlink data to be sent to an address corresponding to the addressing information of the terminal; and the user plane network element is further configured to receive the downlink data forwarding rule from the session management network element, update, based on the downlink data forwarding rule, the routing information corresponding to the label of the MLAN, and forward, by using the downlink path in the updated routing information corresponding to the label of the MLAN, downlink data to be sent to an address corresponding to the addressing information of the terminal.

For technical effects brought in by any design manner in the sixteenth aspect, refer to technical effects brought in by different design manners in the ninth aspect. Details are not described herein again.

These aspects or other aspects in this application may be clearer and easier to understand in description of the following embodiments.

DETAILED DESCRIPTION

Figure 1:
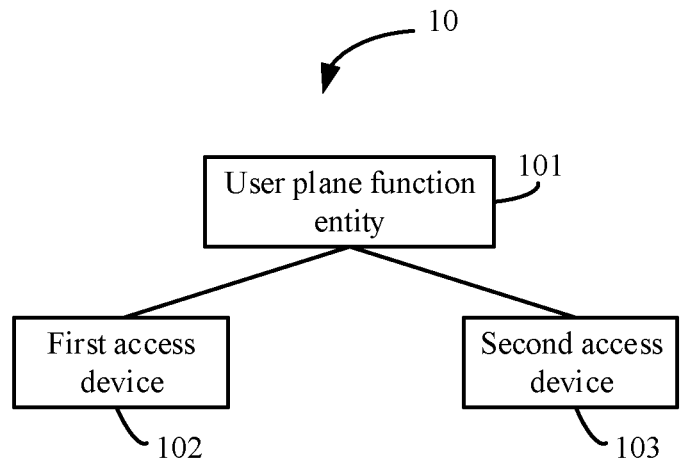
FIG. 1 is a schematic architectural diagram of a data transmission system according to an embodiment of this application.

To help understand technical solutions of embodiments of this application, the following briefly describes technologies related to this application.

Identifier (ID) of an MLAN:

An identifier (ID) of an MLAN is used to identify an MLAN instance. If MLANs are divided based on scenarios such as an enterprise communication scenario and a vehicle to everything communication (V2X) scenario, MLAN scenarios of a same type may be identified by using an MLAN type or a data network name (DNN). In other words, an identifier of one MLAN includes a scenario identifier and an MLAN number. A specific MLAN instance in MLAN scenarios of a same type can be uniquely identified with reference to a scenario identifier and an MLAN number. If DNN resources are abundant, MLANs do not need to be divided based on scenarios, and an identifier of one MLAN corresponds to a unique MLAN instance of one DNN. Whether MLANs are divided based on scenarios is not specifically limited in the following embodiments of this application. An example in which an identifier of one MLAN can uniquely identify one MLAN instance is merely used for description. This is described herein for once, and details are not described below again.

In addition, in the embodiments of this application, an identifier of an MLAN may correspond to a specific service scope, or may be used within a global range. A service scope corresponding to an identifier of an MLAN is not specifically limited in the embodiments of this application.

Tunnel:

A tunnel includes a next generation (N) interface 3 (N3) tunnel and an N interface 9 (N9) tunnel. The N3 tunnel is a tunnel between an access device (for example, a base station) and a user plane function entity; and the N9 tunnel is a tunnel between user plane function entities. Generally, the N3 tunnel is a tunnel at a granularity of a session; and the N9 tunnel may be a tunnel at a granularity of a session, or may be a tunnel at a granularity of a device.

The tunnel at a granularity of a session refers to a tunnel resource established for a session, and the tunnel is used for only one session. The tunnel at a granularity of a session includes only one routing rule, and only the routing rule can be correspondingly used for forwarding data on the tunnel. In addition, a life cycle of the tunnel at a granularity of a session is a life cycle of a session. In other words, when a session disappears or is released, the tunnel at a granularity of a session also needs to be released.

The tunnel at a granularity of a device refers to a tunnel resource established for one or more sessions, and the tunnel can be used for one or more sessions. The tunnel at a granularity of a device may include one or more routing rules, and the one or more routing rules each can be correspondingly used for forwarding data on the tunnel. In addition, a life cycle of the tunnel at a granularity of a device is life cycles of a plurality of sessions corresponding to the tunnel. In other words, assuming that the tunnel at a granularity of a device corresponds to M sessions, when first M−1 sessions of the plurality of sessions corresponding to the tunnel disappear or are released, only a routing rule corresponding to a corresponding session is released, and the tunnel at a granularity of a device can be released only when an $M^{th}$ session in the plurality of sessions corresponding to the tunnel disappears or is released. When the $M^{th}$ session in the plurality of sessions corresponding to the tunnel disappears or is released, the tunnel at a granularity of a device may be alternatively reserved, so that the tunnel does not need to be subsequently re-established. This is not specifically limited in the embodiments of this application.

The session in the embodiments of this application may be, for example, a protocol data unit (PDU) session. This is described herein for once, and details are not described below again.

A tunnel in the following embodiments of this application relates to only the N3 tunnel, and does not relate to the N9 tunnel. This is described herein for once, and details are not described below again.

Path Information:

Path information in the embodiments of this application includes information about an uplink path corresponding to a first terminal, information about a downlink path corresponding to the first terminal, information about an uplink path corresponding to a second terminal, and information about a downlink path corresponding to the second terminal. The information about the uplink path corresponding to the first terminal is used to determine the uplink path corresponding to the first terminal; the information about the downlink path corresponding to the first terminal is used to determine the downlink path corresponding to the first terminal; the information about the uplink path corresponding to the second terminal is used to determine the uplink path corresponding to the second terminal; and the information about the downlink path corresponding to the second terminal is used to determine the downlink path corresponding to the second terminal. In addition, the information about the uplink path corresponding to the first terminal and the information about the downlink path corresponding to the first terminal may also be used to determine a tunnel that is established for the first terminal between a first access device and a first user plane function entity; and the information about the uplink path corresponding to the second terminal and the information about the downlink path corresponding to the second terminal may be used to determine a tunnel that is established for the second terminal between a second access device and a second user plane function entity.

In the embodiments of this application, the first user plane function entity and the second user plane function entity are a same user plane function entity; and the first access device and the second access device may be a same access device, or may be different access devices. This is not specifically limited in the embodiments of this application.

In the embodiments of this application, the information about the uplink path corresponding to the first terminal may include a tunnel identifier of the first user plane function entity that is allocated for the first terminal; the information about the downlink path corresponding to the first terminal may include a tunnel identifier of the first access device that is allocated for the first terminal; the information about the uplink path corresponding to the second terminal may include a tunnel identifier of the second user plane function entity that is allocated for the second terminal; and the information about the downlink path corresponding to the second terminal may include a tunnel identifier of the second access device that is allocated for the second terminal. The tunnel identifier may be, for example, a tunnel endpoint identifier (TEID). This is not specifically limited in the embodiments of this application.

The information about the uplink path corresponding to the first terminal, the information about the downlink path corresponding to the first terminal, the information about the uplink path corresponding to the second terminal, and the information about the downlink path corresponding to the second terminal may further include other information. For example, the information about the uplink path corresponding to the first terminal may further include an IP address of a user plane function entity; the information about the downlink path corresponding to the first terminal may further include an IP address of the first access device; the information about the uplink path corresponding to the second terminal may further include an IP address of a user plane function entity; and the information about the downlink path corresponding to the second terminal may further include an IP address of the second access device, and so on. This is not specifically limited in the embodiments of this application.

The following describes the technical solutions in the embodiments of this application with reference to the accompanying drawings in the embodiments of this application. In descriptions of this application, "/" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in this application, "a plurality of" means two or more than two unless otherwise specified. In addition, to help describe the technical solutions in the embodiments of this application more clearly, in the embodiments of this application, words such as "first" and "second" are used to distinguish between same items whose functions and roles are basically the same or similar items. A person skilled in the art may understand that the words such as "first" and "second" do not constitute a limitation to a quantity and an execution sequence, and the words such as "first" and "second" are not necessarily different.

A network architecture and a service scenario described in the embodiments of this application are intended to describe the technical solutions in the embodiments of this application more clearly, and do not constitute a limitation to the technical solutions provided in the embodiments of this application. A person of ordinary skill in the art may learn that, with evolution of the network architecture and appearance of a new service scenario, the technical solutions provided in the embodiments of this application are also applicable to a similar technical problem.

FIG. 1 is a schematic architectural diagram of a data transmission system 10 according to an embodiment of this application. The data transmission system 10 includes a user plane function entity 101, a first access device 102, and a second access device 103.

A first terminal communicates with the user plane function entity 101 through the first access device 102, and a second terminal communicates with the user plane function entity 101 through the second access device 103.

The user plane function entity 101 is configured to receive a data packet from the first terminal through an uplink path corresponding to the first terminal, where the data packet carries addressing information of the second terminal.

The user plane function entity 101 is further configured to determine, based on information about the uplink path corresponding to the first terminal and the addressing information of the second terminal, a downlink path corresponding to the second terminal.

The user plane function entity 101 is further configured to send the data packet to the second terminal through the downlink path corresponding to the second terminal.

Optionally, in this embodiment of this application, the first access device 102 and the second access device 103 may be a same access device, or may be different access devices. This is not specifically limited in this embodiment of this application.

Optionally, in this embodiment of this application, the user plane function entity may directly communicate with the first access device 102 or the second access device 103, or may communicate with the first access device 102 or the second access device 103 through forwarding by another device. This is not specifically limited in this embodiment of this application.

According to the data transmission system provided in this embodiment of this application, after receiving the data packet from the first terminal through the uplink path corresponding to the first terminal, the user plane function entity can determine, based on the information about the uplink path corresponding to the first terminal and the addressing information of the second terminal, the downlink path corresponding to the second terminal, and can further send the data packet to the second terminal through the downlink path corresponding to the second terminal. Therefore, when two terminals correspond to a same user plane function entity, the two terminals can locally interact with each other.

Optionally, the data transmission system 10 may be applied to a 5th generation (5G) network and future other networks. This is not specifically limited in this embodiment of this application.

Figure 2:
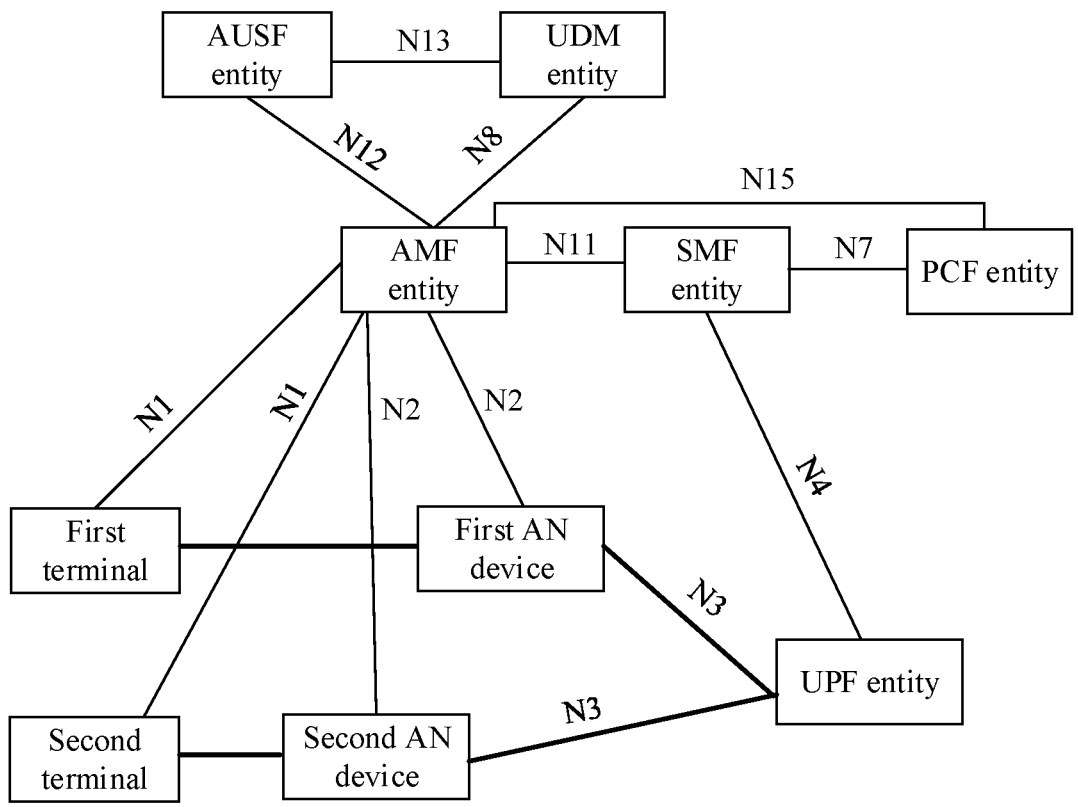
FIG. 2 is a schematic diagram of application of a data transmission system in 5G according to an embodiment of this application.

If the data transmission system 10 is applied to a 5G network, as shown in FIG. 2, a network element or entity corresponding to the user plane function entity 101 may be a UPF entity; a network element or entity corresponding to the first access device 102 may be a first access network (AN) device; and a network element or entity corresponding to the second access device 103 may be a second AN device. The first terminal accesses the network through the first AN device, and the second terminal accesses the network through the second AN device. The first AN device and the second AN device each communicate with the UPF entity through an N3 interface (N3).

In addition, as shown in FIG. 2, the 5G network may further include an access and mobility management function (AMF) entity, a session management function (SMF) entity, a unified data management (UDM) entity, an authentication server function (AUSF) entity, a policy control function (PCF) entity, and the like. This is not specifically limited in this embodiment of this application.

The first terminal and the second terminal each communicate with the AMF entity through an N1 interface (N1); the first AN device and the second AN device each communicate with the AMF entity through an N2 interface (N2); the AMF entity communicates with the AUSF entity through an N12 interface (N12); the AMF entity communicates with the UDM entity through an N8 interface (N8); the AMF entity communicates with the SMF entity through an N11 interface (N11); the AMF entity communicates with the PCF entity through an N15 interface (N15); the AUSF entity communicates with the UDM entity through an N13 interface (N13); and the SMF entity communicates with the UPF entity through an N4 interface (N4).

Optionally, if the first AN device and the second AN device are different AN devices, the first AN device and the second AN device may be connected to different AMF entities. This is not specifically limited in this embodiment of this application.

It should be noted that, names of interfaces between the network elements in FIG. 2 are merely used as an example. During implementation, names of the interfaces may be other names. This is not specifically limited in this embodiment of this application.

It should be noted that, the first AN device, the second AN device, the AMF entity, the SMF entity, the AUSF entity, the UDM entity, the UPF entity, the PCF entity, and the like in FIG. 2 are only names, and the names do not constitute a limitation to the devices. In the 5G network and future other networks, network elements or entities corresponding to the first AN device, the second AN device, the AMF entity, the SMF entity, the AUSF entity, the UDM entity, the UPF entity, and the PCF entity may alternatively be other names. This is not specifically limited in this embodiment of this application. For example, the UDM entity may be alternatively replaced with a home subscriber server (HSS), a user subscription database (USD), a database entity, or the like. This is described herein for once, and details are not described below again.

Figure 9:
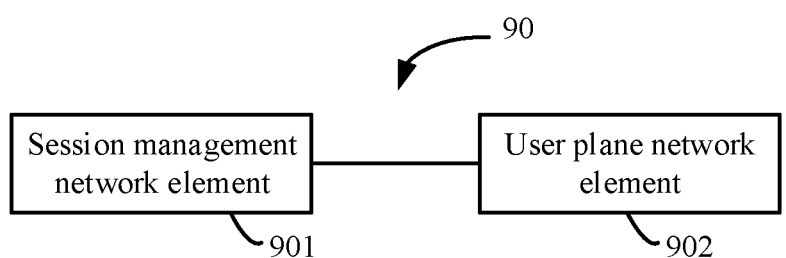
FIG. 9 is a schematic architectural diagram of another data transmission system according to an embodiment of this application.

FIG. 9 is a schematic architectural diagram of a data transmission system 90 according to an embodiment of this application. The data transmission system 90 includes a session management network element 901 and a user plane network element 902.

The session management network element 901 is configured to obtain an identifier of an MLAN associated with a session of a terminal, and determine an uplink data forwarding rule based on the identifier of the MLAN, where the uplink data forwarding rule includes a label of the MLAN and information about an uplink path corresponding to the session, and the label of the MLAN is used to identify data in the MLAN or used to identify an MLAN associated with the session.

The session management network element 901 is further configured to send the uplink data forwarding rule to the user plane network element 902, where the uplink data forwarding rule is used to instruct the user plane network element 902 to forward, by using routing information corresponding to the label of the MLAN, uplink data received on the uplink path.

The user plane network element 902 is configured to receive the uplink data forwarding rule from the session management network element 901, and forward, based on the uplink data forwarding rule by using the routing information corresponding to label of the MLAN, the uplink data received on the uplink path.

Optionally, in this embodiment of this application, the session management network element 901 and the user plane network element 902 may directly communicate with each other, or may communicate with each other through forwarding by another device. This is not specifically limited in this embodiment of this application.

According to the data transmission system provided in this embodiment of this application, the session management network element can determine the uplink data forwarding rule based on the identifier of the MLAN, and send the uplink data forwarding rule to the user plane network element, and the uplink data forwarding rule is used to instruct the user plane network element to forward, by using the routing information corresponding to the label of the MLAN, the uplink data received on the uplink path. Therefore, based on this solution, when two terminals correspond to a same user plane function network element, the two terminals can locally interact with each other.

Optionally, the data transmission system 20 may be applied to a 5G network and future other networks. This is not specifically limited in this embodiment of this application.

If the data transmission system 20 is applied to the 5G network, as shown in FIG. 2, a network element or entity corresponding to the session management network element 901 may be an SMF network element in the 5G network; and a network element or entity corresponding to the user plane network element 902 may be a UPF network element in the 5G network. For remaining related description of the 5G network, refer to the embodiment shown in FIG. 2. Details are not described herein again.

Optionally, the terminal in this embodiment of this application may include various handheld devices, vehicle-mounted devices, wearable devices, and computing devices that have a wireless communications function, or another processing device connected to a wireless modem; and the terminal may further include a subscriber unit, a cellular phone, a smart phone, a wireless data card, a personal digital assistant (PDA) computer, a tablet computer, a wireless modem, a handheld device, a laptop computer, a cordless phone or a wireless local loop (WLL) board, a machine type communication (MTC) terminal, user equipment (UE), a mobile station (MS), a terminal device, or the like. For convenience of description, in this application, the devices mentioned above are collectively referred to as "terminal".

Optionally, an access device in this embodiment of this application refers to a device that accesses a core network, and may be, for example, a base station, a broadband network gateway (BNG), an aggregation switch, a non-3rd generation partnership project (3GPP) access device, or the like. The base station may include a macro base station, a micro base station (also referred to as a small cell), a relay station, an access point, and the like in various forms.

Optionally, an AMF entity in this embodiment of this application may be further responsible for functions such as registration management, mobility management, and lawful interception. This is not specifically limited in this embodiment of this application.

Optionally, an SMF entity in this embodiment of this application is configured to perform session management, including session establishment, session modification, session release, allocation and management of an internet protocol (IP) address of a terminal, selection and control of a UPF entity, and session related control functions such as lawful interception.

Optionally, the UPF entity in this embodiment of this application has a function of the user plane function entity in FIG. 1, and may further implement user plane functions of a serving gateway (SGW) and a packet data network gateway (PGW). In addition, the UPF entity may alternatively be a software-defined network (SDN) switch. This is not specifically limited in this embodiment of this application.

Optionally, an AUSF entity in this embodiment of this application is configured to authenticate a terminal based on subscription data of the terminal.

Optionally, a UDM entity in this embodiment of this application is configured to store user subscription data. In addition, the UDM entity may further have functions such as authentication, subscriber identifier processing, and subscription management. This is not specifically limited in this embodiment of this application.

Optionally, a PCF entity in this embodiment of this application provides a policy rule, and supports policy related functions such as managing behavior of a network by using a unified policy architecture.

Optionally, the user plane function entity in FIG. 1 or the session management network element in the embodiment shown in FIG. 9 may be implemented by an entity device, or may be jointly implemented by a plurality of entity devices, or may be implemented by a logical function module in an entity device. This is not specifically limited in this embodiment of this application.

Figure 3:
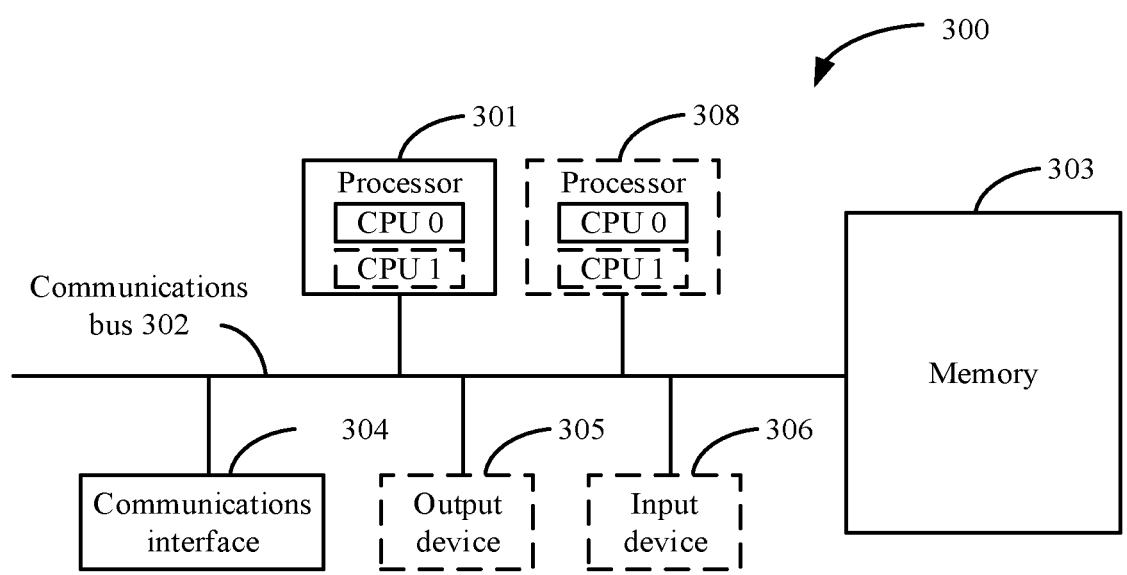
FIG. 3 is a schematic diagram of a hardware apparatus of a communications device according to an embodiment of this application.

For example, the user plane function entity in FIG. 1 or the session management network element in the embodiment shown in FIG. 9 may be implemented by a communications device in FIG. 3. FIG. 3 is a schematic diagram of a hardware structure of a communications device according to an embodiment of this application. The communications device 300 includes at least one processor 301, a communications bus 302, a memory 303, and at least one communications interface 304.

The processor 301 may be a general-purpose central processing unit (CPU), a microprocessor, an application-specific integrated circuit (ASIC), or one or more integrated circuits configured to control program execution of solutions of this application.

The communications bus 302 may include a channel, to transfer information between the foregoing components.

The communications interface 304 uses any apparatus such as a transceiver to communicate with another device or communications network, for example, Ethernet, a radio access network (RAN), or a wireless local area network (WLAN).

The memory 303 may be a read-only memory (ROM), another type of static storage device capable of storing static information and an instruction, a random access memory (RAM), or another type of dynamic storage device capable of storing information and an instruction; or may be an electrically erasable programmable read-only memory (EEPROM), a compact disc read-only memory (CD-ROM) or another optical compact disc storage, an optical disc storage (including a compact optical disc, a laser disc, an optical disc, a digital versatile disc, a Blu-ray disc, or the like), or a magnetic disk storage medium or another magnetic storage device, or any other medium that can be configured to carry or store expected program code in a form of an instruction or a data structure and that can be accessed by a computer. However, this does not constitute a limitation herein. The memory may exist independently, and is connected to the processor through the communications bus 302. Alternatively, the memory may be integrated with the processor.

The memory 303 is configured to store a computer execution instruction used to execute the solutions of this application, and the execution is controlled by the processor 301. The processor 301 is configured to execute the computer execution instruction stored in the memory 303, to implement the data transmission method provided in the following embodiments of this application.

During implementation, in an embodiment, the processor 301 may include one or more CPUs, for example, a CPU 0 and a CPU 1 in FIG. 3.

During implementation, in an embodiment, the communications device 300 may include a plurality of processors, for example, the processor 301 and a processor 308 in FIG. 3. Each of these processors may be a single-CPU processor, or may be a multi-CPU processor. The processor herein may be one or more devices, circuits, and/or processing cores that are used to process data (for example, a computer program instruction).

During implementation, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive an input of a user in a plurality of manners. For example, the input device 306 may be a mouse, a keyboard, a touchscreen device, a sensor device, or the like.

The communications device 300 may be a general-purpose device, or a special-purpose device. During implementation, the communications device 300 may be a desktop computer, a portable computer, a network server, a PDA, a mobile phone, a tablet computer, a wireless terminal device, a built-in device, or a device with a structure similar to that in FIG. 3. This embodiment of this application sets no limitation to a type of the communications device 300.

A data transmission method provided in the embodiments of this application is described below in detail with reference to FIG. 1 to FIG. 3, or FIG. 9.

Figure 4A:
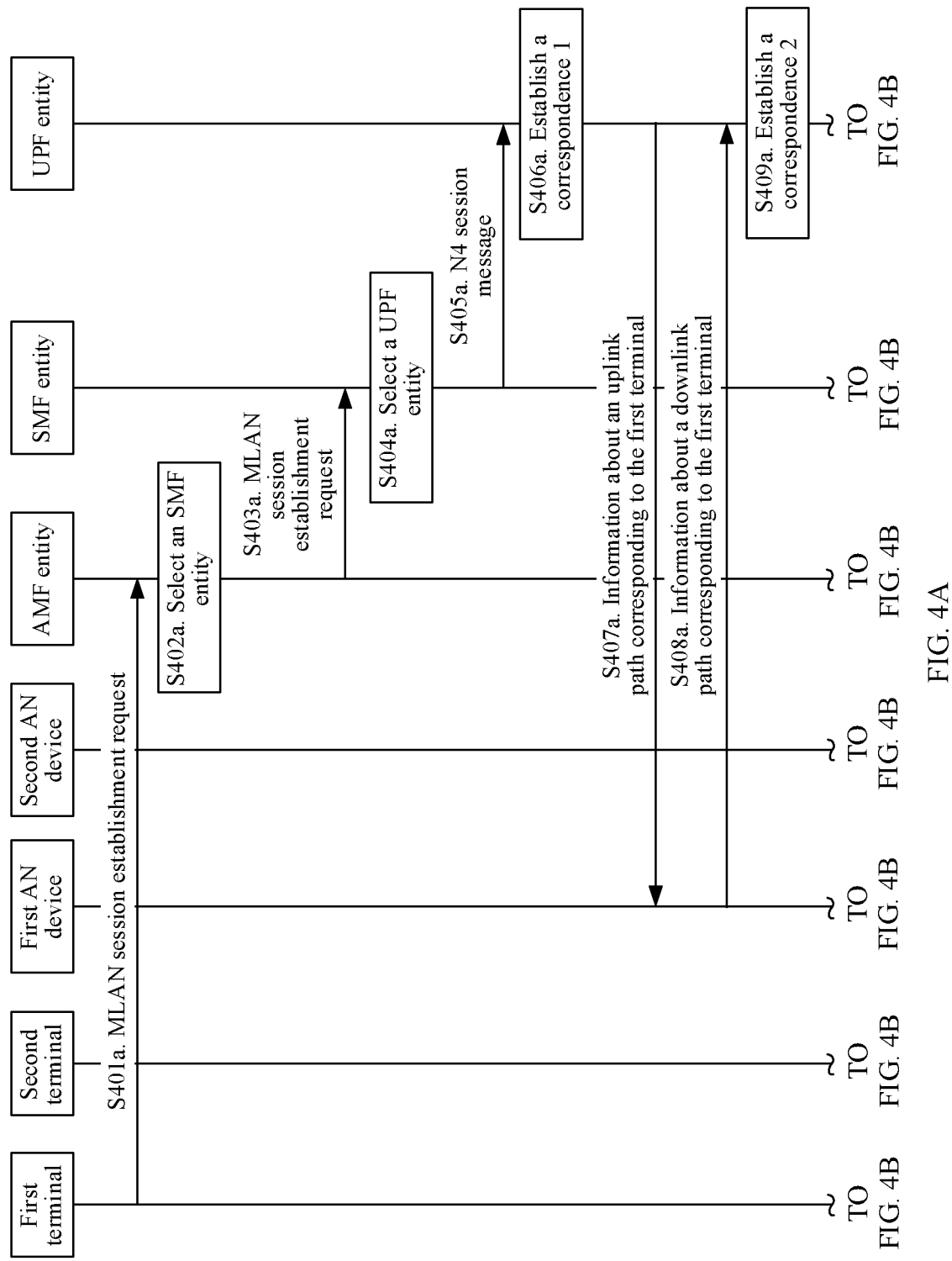
FIG. 4A, FIG. 4B, and FIG. 4C are a schematic flowchart 1 of a data transmission method according to an embodiment of this application.
Figure 4B:
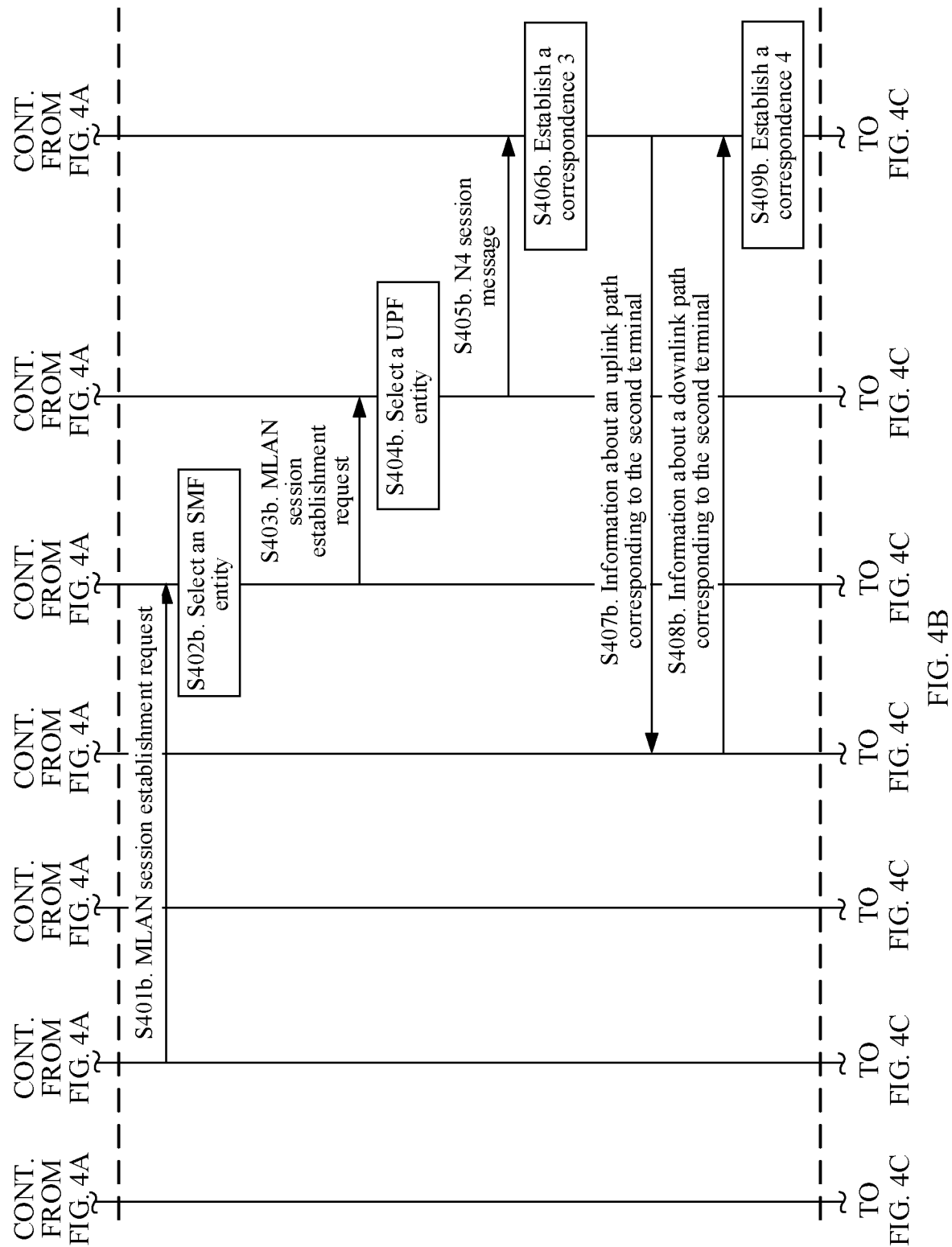
Figure 4C:
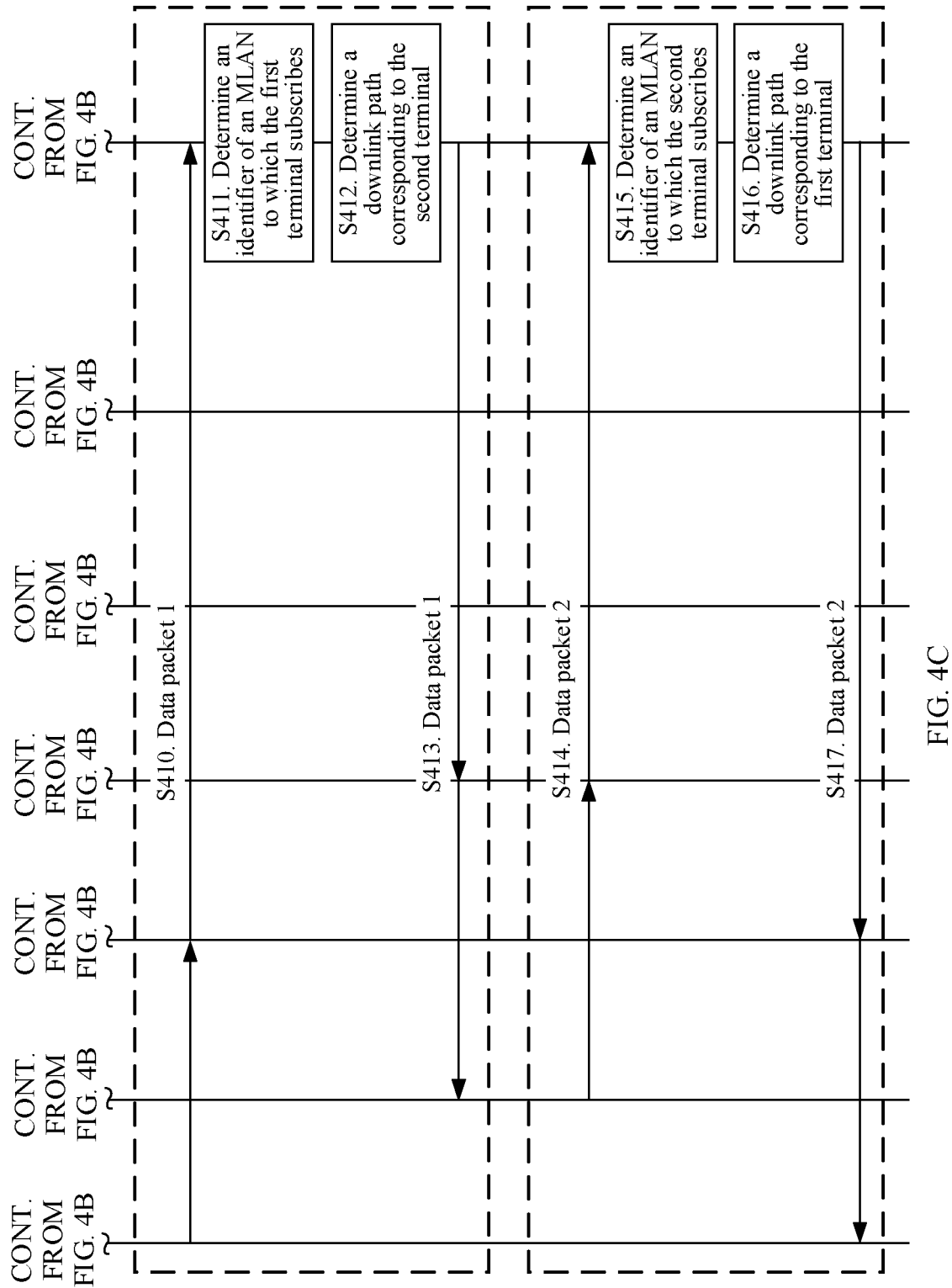
Figure 5A:
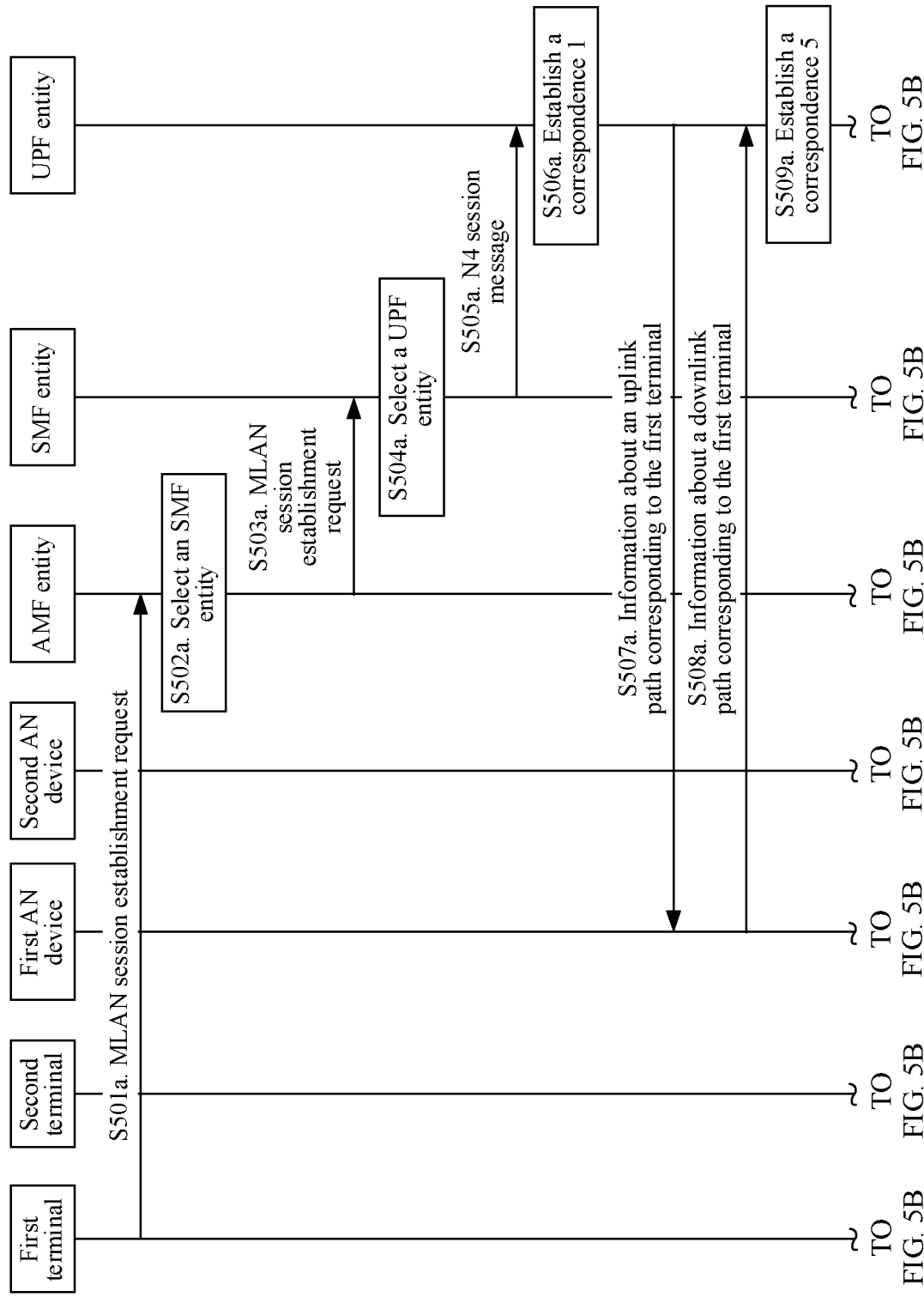
FIG. 5A, FIG. 5B, FIG. 5C, and FIG. 5D are a schematic flowchart 2 of a data transmission method according to an embodiment of this application.
Figure 5B:
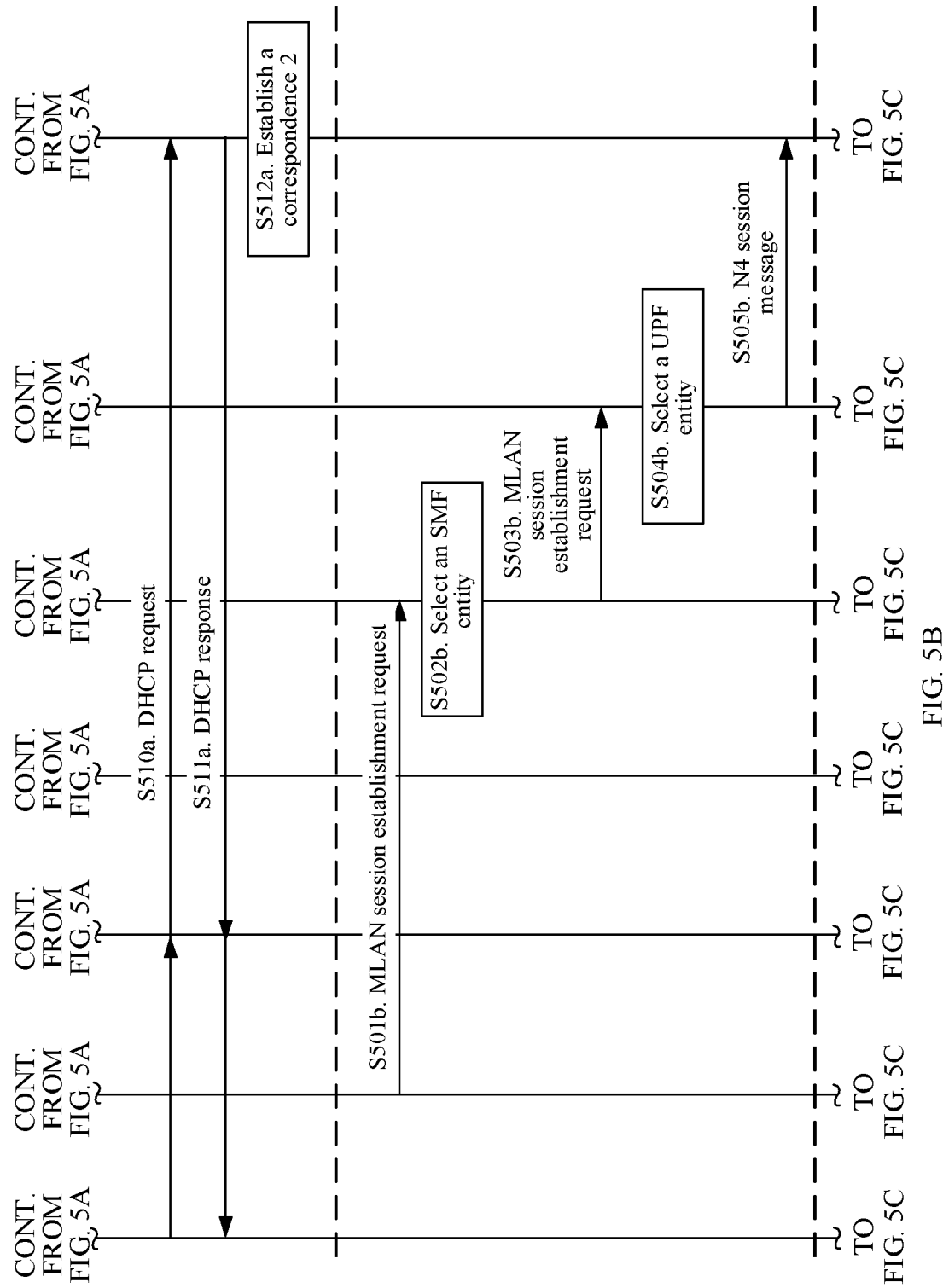
Figure 5C:
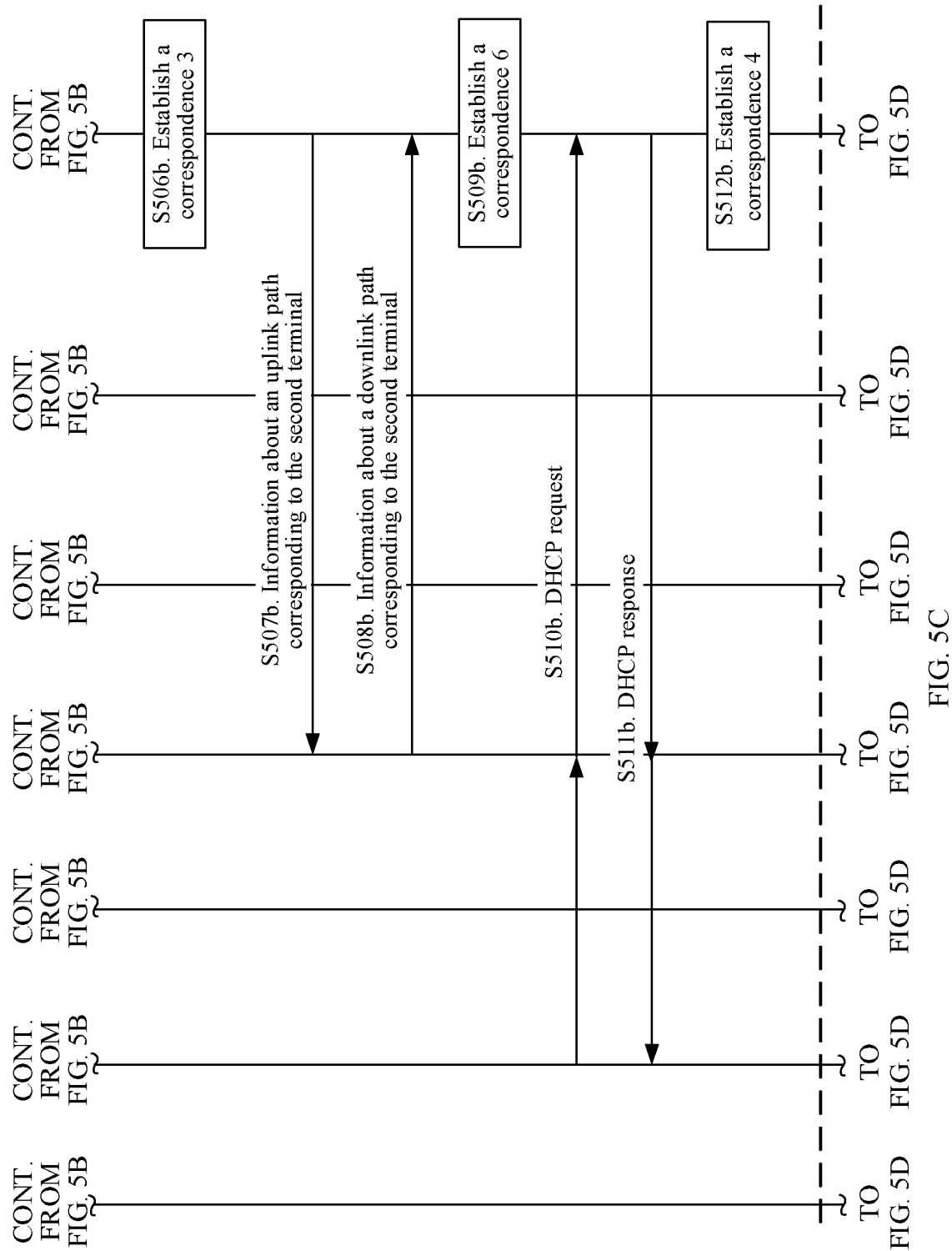
Figure 5D:
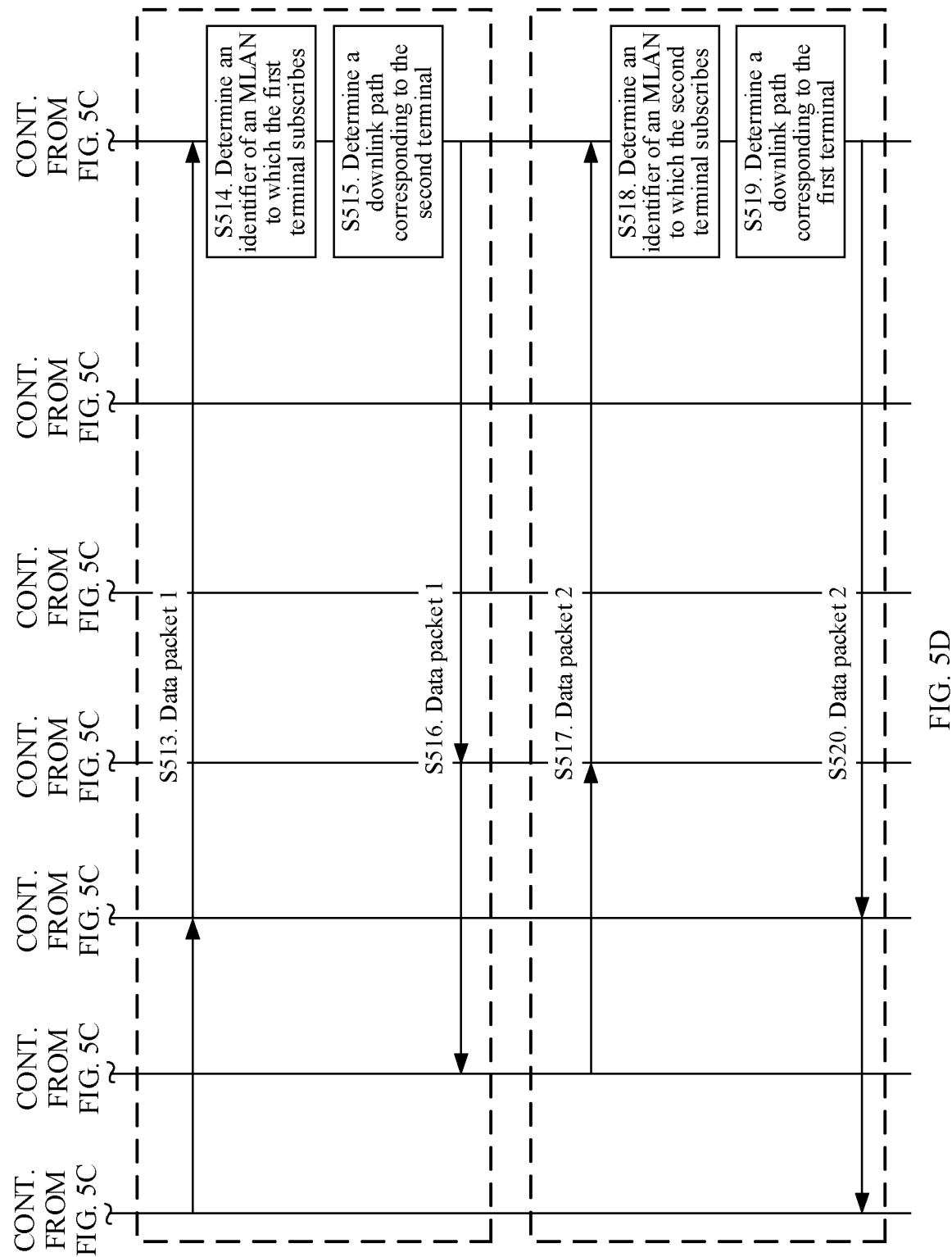

Assuming that the data transmission system shown in FIG. 1 is applied to the 5G network shown in FIG. 2, a data transmission method provided in an embodiment of this application may be shown in FIG. 4A, FIG. 4B, and FIG. 4C, and includes the following steps.

S401a. A first terminal sends an MLAN session establishment request to an AMF entity, so that the AMF entity receives the MLAN session establishment request from the first terminal, where the MLAM session establishment request carries an identifier of an MLAN to which the first terminal subscribes.

A configuration process of the identifier of the MLAN to which the first terminal subscribes is described in the following embodiments. Details are not described herein.

Optionally, in this embodiment of this application, if the identifier of the MLAN to which the first terminal subscribes corresponds to a specific service scope, information about a specific service area corresponding to the identifier of the MLAN is further configured on the first terminal. In this way, the first terminal can send, based on the information about the specific service area corresponding to the identifier of the MLAN, the MLAN session establishment request to the AMF entity within the specific service area corresponding to the identifier of the MLAN. If the first terminal sends the MLAN session establishment request to the AMF entity beyond the specific service area corresponding to the identifier of the MLAN, the AMF entity or an SMF entity may reject, after it is determined that a current location of the first terminal is not in the specific service area corresponding to the identifier of the MLAN, the MLAN session establishment request sent by the first terminal. This is not specifically limited in this embodiment of this application. In this embodiment of this application, only an example in which the first terminal initiates a normal MLAN session establishment procedure is used for description. In other words, when the identifier of the MLAN to which the first terminal subscribes is available within a global range, the first terminal sends the MLAN session establishment request to the AMF entity; alternatively, when the identifier of the MLAN to which the first terminal subscribes corresponds to a specific service scope, the first terminal sends the MLAN session establishment request within the specific service area corresponding to the identifier of the MLAN to which the first terminal subscribes. This is described herein for once, and details are not described below again.

S402a. The AMF entity selects an SMF entity.

The manner in which the AMF entity selects the SMF entity is not described herein.

S403a. The AMF entity sends the MLAN session establishment request to the SMF entity, so that the SMF entity receives the MLAN session establishment request from the AMF entity.

S404a. The SMF entity selects a UPF entity.

The manner in which the SMF entity selects the UPF entity is not described herein.

Optionally, in this embodiment of this application, the SMF entity may alternatively obtain, from a UDM entity, the identifier of the MLAN to which the first terminal subscribes, and determine whether an identifier of an MLAN carried in the MLAN session establishment request is the same as the identifier of the MLAN to which the first terminal subscribes. If the identifier of the MLAN carried in the MLAN session establishment request is the same as the identifier of the MLAN to which the first terminal subscribes, it may be determined that the identifier of the MLAN carried in the MLAN session establishment request is the identifier of the MLAN to which the first terminal subscribes, and then a subsequent procedure can be performed; or if the identifier of the MLAN carried in the MLAN session establishment request is different from the identifier of the MLAN to which the first terminal subscribes, it may be determined that the identifier of the MLAN carried in the MLAN session establishment request is not the identifier of the MLAN to which the first terminal subscribes, and the procedure ends. This is not specifically limited in this embodiment of this application.

S405a. The SMF entity sends an N4 session message to the UPF entity, so that the UPF entity receives the N4 session message from the SMF entity, where the N4 session message carries the identifier of the MLAN to which the first terminal subscribes and addressing information of the first terminal.

Optionally, in this embodiment of this application, the addressing information of the first terminal may be an IP address or media access control (MAC) address of the first terminal. This is not specifically limited in this embodiment of this application.

If the addressing information of the first terminal is an IP address, the SMF entity may obtain the IP address of the first terminal in the following manner: An IP address pool corresponding to an identifier of each MLAN is configured on the SMF entity, and a correspondence between an identifier of an MLAN and information about an IP address pool is established. When the first terminal establishes an MLAN session, a corresponding IP address pool can be determined based on an identifier of an MLAN to which the first terminal subscribes and the correspondence, and an IP address in the IP address pool is allocated for the first terminal.

If the addressing information of the first terminal is a MAC address, the SMF entity may obtain the MAC address of the first terminal in the following manner: The MAC address of the first terminal is carried in the MLAN session establishment request sent by the first terminal to the SMF entity through the AMF entity, so that the SMF entity can obtain the MAC address from the MLAN session establishment request.

The SMF entity may alternatively obtain the IP address or MAC address of the first terminal in another manner. This is not specifically limited in this embodiment of this application.

S406a. The UPF entity establishes a correspondence between the identifier of the MLAN to which the first terminal subscribes and information about an uplink path corresponding to the first terminal.

Optionally, in this embodiment of this application, the information about the uplink path corresponding to the first terminal may be allocated by the SMF entity, or may be allocated by the UPF entity. This is not specifically limited in this embodiment of this application. If the information about the uplink path corresponding to the first terminal is allocated by the SMF entity, the N4 session message in step S405a may further carry the information about the uplink path corresponding to the first terminal. This is described herein for once, and details are not described below again.

For ease of description, in this embodiment of this application, the correspondence between the identifier of the MLAN to which the first terminal subscribes and the information about the uplink path corresponding to the first terminal is recorded as a correspondence 1. This is described herein for once, and details are not described below again. The correspondence 1 may be shown in Table 1.

TABLE 1

| Identifier of an MLAN to which a | Information about an uplink path |

TABLE 1-continued

| first terminal subscribes | corresponding to the first terminal |
|---|---|

Optionally, the correspondence 1 may be alternatively sent to the UPF entity after being created by the SMF entity. This is not specifically limited in this embodiment of this application.

S407a. The UPF entity sends the information about the uplink path corresponding to the first terminal to a first AN device, so that the first AN device receives the information about the uplink path corresponding to the first terminal from the UPF entity.

S408a. The first AN device sends information about a downlink path corresponding to the first terminal to the UPF entity, so that the UPF entity receives the information about the downlink path corresponding to the first terminal from the first AN device.

Optionally, in this embodiment of this application, the information about the downlink path corresponding to the first terminal may be allocated by the SMF entity, or may be allocated by the first AN device. This is not specifically limited in this embodiment of this application.

S409a. The UPF entity establishes a correspondence between the identifier of the MLAN to which the first terminal subscribes, the information about the downlink path corresponding to the first terminal, and the addressing information of the first terminal.

For ease of description, in this embodiment of this application, the correspondence between the identifier of the MLAN to which the first terminal subscribes, the information about the downlink path corresponding to the first terminal, and the addressing information of the first terminal may be recorded as a correspondence 2. This is described herein for once, and details are not described below again. The correspondence 2 may be shown in Table 2.

TABLE 2

| Identifier of an MLAN to which a first terminal subscribes | Information about a downlink path corresponding to the first terminal | Addressing information of the first terminal |
|---|---|---|

Optionally, the correspondence 2 may be alternatively sent to the UPF entity after being created by the SMF entity. This is not specifically limited in this embodiment of this application.

Steps S401b to S409b are similar to steps S401a to S409a. A difference lies in that in steps S401b to S409b, the first terminal in steps S401a to S409a is replaced with a second terminal, and the first AN device is replaced with a second AN device. For details, refer to steps S401a to S409a. Details are not described herein again.

In step S406b, a correspondence that is between an identifier of an MLAN to which the second terminal subscribes and information about an uplink path corresponding to the second terminal and that is established by the UPF entity may be recorded as a correspondence 3. This is described herein for once, and details are not described below again. The correspondence 3 may be shown in Table 3.

TABLE 3

| Identifier of an MLAN to which a second terminal subscribes | Information about an uplink path corresponding to the second terminal |
|---|---|

In step S409b, a correspondence that is between the identifier of the MLAN to which the second terminal subscribes, information about a downlink path corresponding to the second terminal, and addressing information of the second terminal and that is established by the UPF entity may be recorded as a correspondence 4. This is described herein for once, and details are not described below again. The correspondence 4 may be shown in Table 4.

TABLE 4

| Identifier of an MLAN to which a second terminal subscribes | Information about a downlink path corresponding to the second terminal | Addressing information of the second terminal |
|---|---|---|

Optionally, the correspondence 3 and the correspondence 4 may be alternatively sent to the UPF entity after being created by the SMF entity. This is not specifically limited in this embodiment of this application.

Optionally, to save storage resources, the foregoing Table 1 and Table 2 may be combined, and Table 3 and Table 4 may be combined. Combination results may be respectively shown in Table 5 and Table 6.

TABLE 5

| Identifier of an MLAN to which a first terminal subscribes | Information about an uplink path corresponding to the first terminal | Information about a downlink path corresponding to the first terminal | Addressing information of the first terminal |
|---|---|---|---|

TABLE 6

| Identifier of an MLAN to which a second terminal subscribes | Information about an uplink path corresponding to the second terminal | Information about a downlink path corresponding to the second terminal | Addressing information of the second terminal |
|---|---|---|---|

Optionally, if the identifier of the MLAN to which the first terminal subscribes is the same as the identifier of the MLAN to which the second terminal subscribes, to further save resources, the foregoing Table 5 and Table 6 may be combined, and a result is shown in Table 7.

TABLE 7

| Identifier of an MLAN | Information about an uplink path | Information about a downlink path | Addressing information |
|---|---|---|---|
| Identifier of an MLAN to which a first terminal/second terminal subscribes | Information about an uplink path corresponding to the first terminal Information about an uplink path corresponding to the second terminal | Information about a downlink path corresponding to the first terminal Information about a downlink path corresponding to the second terminal | Addressing information of the first terminal Addressing information of the second terminal |

That is, when identities of MLANs to which a plurality of terminals subscribe are the same, the identities of the MLANs may be recorded as shared information. For example, an established correspondence between an identifier of an MLAN, information about an uplink path, information about a downlink path, and addressing information may be shown in Table 8.

TABLE 8

| Identifier of an MLAN | Information about an uplink path | Information about a downlink path | Addressing information |
|---|---|---|---|
| a | Information about an uplink path corresponding to a first terminal | Information about a downlink path corresponding to the first terminal | Addressing information of the first terminal |
| | Information about an uplink path corresponding to a second terminal | Information about a downlink path corresponding to the second terminal | Addressing information of the second terminal |
| | Information about an uplink path corresponding to a third terminal | Information about a downlink path corresponding to the third terminal | Addressing information of the third terminal |
| | Information about an uplink path corresponding to a fourth terminal | Information about a downlink path corresponding to the fourth terminal | Addressing information of the fourth terminal |
| | Information about an uplink path corresponding to a fifth terminal | Information about a downlink path corresponding to the fifth terminal | Addressing information of the fifth terminal |
| | Information about an uplink path corresponding to a sixth terminal | Information about a downlink path corresponding to the sixth terminal | Addressing information of the sixth terminal |
| | ... | ... | ... |
| b | Information about an uplink path corresponding to a seventh terminal | Information about a downlink path corresponding to the seventh terminal | Addressing information of the seventh terminal |
| | Information about an uplink path corresponding to an eighth terminal | Information about a downlink path corresponding to the eighth terminal | Addressing information of the eighth terminal |
| | Information about an uplink path corresponding to a ninth terminal | Information about a downlink path corresponding to the ninth terminal | Addressing information of the ninth terminal |
| | ... | ... | ... |
| ... | ... | ... | ... |

The foregoing correspondences may be combined or simplified in another manner. This is not specifically limited in this embodiment of this application. In addition, the foregoing correspondences may be represented in a form of tables, and may be alternatively represented in another manner, for example, in a form of text or session context. This is not specifically limited in this embodiment of this application.

Optionally, using an example in which the identifier of the MLAN to which the first terminal subscribes is the same as the identifier of the MLAN to which the second terminal subscribes, and the first terminal sends a data packet 1 to the second terminal, the data transmission method provided in this embodiment of this application further includes the following steps S410 to S413.

S410. The first terminal sends the data packet 1 to the UPF entity through the uplink path corresponding to the first terminal, so that the UPF entity receives the data packet 1 from the first terminal through the uplink path corresponding to the first terminal. The data packet 1 carries addressing information of the second terminal, and the addressing information of the second terminal is used as destination addressing information.

Optionally, the data packet 1 may further carry the addressing information of the first terminal as source addressing information. This is not specifically limited in this embodiment of this application.

S411. The UPF entity determines, based on the information about the uplink path corresponding to the first terminal, the identifier of the MLAN to which the first terminal subscribes.

In some embodiments, the UPF entity may determine, based on the information about the uplink path corresponding to the first terminal and the correspondence 1, the identifier of the MLAN to which the first terminal subscribes.

For example, the UPF entity may query Table 1, Table 5, Table 7, or Table 8 based on the information about the uplink path corresponding to the first terminal, to obtain the identifier of the MLAN to which the first terminal subscribes.

S412. The UPF entity determines, based on the identifier of the MLAN to which the first terminal subscribes and the addressing information of the second terminal, a downlink path corresponding to the second terminal.

In some embodiments, the UPF entity may determine, based on the identifier of the MLAN to which the first terminal subscribes, the addressing information of the second terminal, and the correspondence 4, the downlink path corresponding to the second terminal.

For example, the UPF entity may query Table 4, Table 6, Table 7, or Table 8 based on the identifier of the MLAN to which the first terminal subscribes and the addressing information of the second terminal, to obtain information about the downlink path corresponding to the second terminal, and further determine the downlink path corresponding to the second terminal.

Optionally, if the UPF entity cannot determine the information about the downlink path corresponding to the second terminal, for example, the query fails, the data packet 1 is discarded. This is not specifically limited in this embodiment of this application.

S413. The UPF entity sends the data packet 1 to the second terminal through the downlink path corresponding to the second terminal.

Optionally, in this embodiment of this application, the destination addressing information carried in the data packet 1 may alternatively be information about a broadcast address. After detecting that the destination addressing information is information about a broadcast address, the UPF entity or the SMF entity may replace the broadcast address with addressing information of all terminals other than the first terminal in the MLAN to which the first terminal subscribes, determine, in the foregoing manner based on the identifier of the MLAN and addressing information of the corresponding terminal, a downlink path corresponding to the corresponding terminal, and further send the data packet 1 to the corresponding terminal through the downlink path corresponding to the corresponding terminal. This is not specifically limited in this embodiment of this application.

Alternatively, optionally, using an example in which the identifier of the MLAN to which the first terminal subscribes is the same as the identifier of the MLAN to which the second terminal subscribes, and the second terminal sends a data packet 2 to the first terminal, the data transmission method provided in this embodiment of this application further includes the following steps S414 to S417.

S414. The second terminal sends the data packet 2 to the UPF entity through the uplink path corresponding to the second terminal, so that the UPF entity receives the data packet 2 from the second terminal through the uplink path corresponding to the second terminal. The data packet 2 carries the addressing information of the first terminal, and the addressing information of the first terminal is used as destination addressing information.

Optionally, the data packet 2 may further carry the addressing information of the second terminal as source addressing information. This is not specifically limited in this embodiment of this application.

S415. The UPF entity determines, based on information about the uplink path corresponding to the second terminal, the identifier of the MLAN to which the second terminal subscribes.

In some embodiments, the UPF entity may determine, based on the information about the uplink path corresponding to the second terminal and the correspondence 3, the identifier of the MLAN to which the second terminal subscribes.

For example, the UPF entity may query Table 3, Table 6, Table 7, or Table 8 based on the information about the uplink path corresponding to the second terminal, to obtain the identifier of the MLAN to which the second terminal subscribes.

S416. The UPF entity determines, based on the identifier of the MLAN to which the second terminal subscribes and the addressing information of the first terminal, the downlink path corresponding to the first terminal.

In some embodiments, the UPF entity may determine, based on the identifier of the MLAN to which the second terminal subscribes, the addressing information of the first terminal, and the correspondence 2, the downlink path corresponding to the first terminal.

For example, the UPF entity may query Table 2, Table 5, Table 7, or Table 8 based on the identifier of the MLAN to which the second terminal subscribes and the addressing information of the first terminal, to obtain the information about the downlink path corresponding to the first terminal, and further determine the downlink path corresponding to the first terminal.

Optionally, if the UPF entity cannot determine the information about the downlink path corresponding to the first terminal, for example, the query fails, the data packet 2 is discarded. This is not specifically limited in this embodiment of this application.

S417. The UPF entity sends the data packet 2 to the first terminal through the downlink path corresponding to the first terminal.

Optionally, in this embodiment of this application, the destination addressing information carried in the data packet 2 may alternatively be information about a broadcast address. After detecting that the destination addressing information is information about a broadcast address, the UPF entity or the SMF entity may replace the broadcast address with addressing information of all terminals other than the second terminal in the MLAN to which the second terminal subscribes, and determine, in the foregoing manner based on the identifier of the MLAN and addressing information of the corresponding terminal, a downlink path corresponding to the corresponding terminal, and further send the data packet 2 to the corresponding terminal through the downlink path corresponding to the corresponding terminal. This is not specifically limited in this embodiment of this application.

According to the data transmission method provided in this embodiment of this application, after receiving the data packet from the first terminal through the uplink path corresponding to the first terminal, the UPF entity can determine, based on the information about the uplink path corresponding to the first terminal and the addressing information of the second terminal, the downlink path corresponding to the second terminal, and can further send the data packet to the second terminal through the downlink path corresponding to the second terminal; alternatively, after receiving the data packet from the second terminal through the uplink path corresponding to the second terminal, the UPF entity can determine, based on the information about the uplink path corresponding to the second terminal and the addressing information of the first terminal, the downlink path corresponding to the first terminal, and can further send the data packet to the first terminal through the downlink path corresponding to the first terminal. Therefore, when two terminals correspond to a same UPF entity, the two terminals can locally interact with each other. For example, when two terminals that access a same MLAN correspond to a same UPF entity, the two terminals can locally interact with each other in the MLAN.

An action of the UPF entity in the foregoing steps S401a to S417 may be performed by the processor 301 in the communications device 300 shown in FIG. 3 invoking application program code stored in the memory 303. No limitation is imposed on thereto in this embodiment of this application.

Optionally, assuming that the data transmission system shown in FIG. 1 is applied to the 5G network shown in FIG. 2, a data transmission method provided in an embodiment of this application may be shown in FIG. 5A, FIG. 5B, FIG. 5C, and FIG. 5D, and includes the following steps.

Steps S501a to S504a are similar to steps S401a to S404a. For details, refer to the embodiment shown in FIG. 4A, FIG. 4B, and FIG. 4C. Details are not described herein again.

S505a. The SMF entity sends an N4 session message to the UPF entity, so that the UPF entity receives the N4 session message from the SMF entity, where the N4 session message carries the identifier of the MLAN to which the first terminal subscribes.

Steps S506a to S508a are similar to steps S401a to S408a. For details, refer to the embodiment shown in FIG. 4A, FIG. 4B, and FIG. 4C. Details are not described herein again.

S509a. The UPF entity establishes a correspondence between the identifier of the MLAN to which the first terminal subscribes, the information about the uplink path corresponding to the first terminal, and the information about the downlink path corresponding to the first terminal.

For ease of description, in this embodiment of this application, the correspondence between the identifier of the MLAN to which the first terminal subscribes, the information about the uplink path corresponding to the first terminal, and the information about the downlink path corresponding to the first terminal may be recorded as a correspondence 5. This is described herein for once, and details are not described below again. The correspondence 5 may be shown in Table 9.

TABLE 9

| Identifier of an MLAN to which a first terminal subscribes | Information about a downlink path corresponding to the first terminal | Information about an uplink path corresponding to the first terminal |
| --- | --- | --- |

Optionally, the correspondence 5 may be alternatively sent to the UPF entity after being created by the SMF entity. This is not specifically limited in this embodiment of this application.

S510a. The first terminal sends a dynamic host configuration protocol (DHCP) request to the UPF entity through the uplink path corresponding to the first terminal, so that the UPF entity receives the DHCP request from the first terminal, where the DHCP request carries a MAC address of the first terminal.

Optionally, if a DHCP server is integrated into the UPF entity, after receiving the DHCP request from the first terminal, the UPF entity may parse out the MAC address of the first terminal in the DHCP request, and allocate an IP address for the first terminal, and subsequent steps S511a and S512a are performed.

S511a. The UPF entity sends a DHCP response to the first terminal, so that the first terminal receives the DHCP response from the UPF entity, where the DHCP response carries the IP address of the first terminal.

S512a. The UPF entity establishes, based on the correspondence 5 and addressing information of the first terminal, a correspondence between the identifier of the MLAN to which the first terminal subscribes, the information about the downlink path corresponding to the first terminal, and the addressing information of the first terminal.

Optionally, in this embodiment of this application, the addressing information of the first terminal may be the IP address or the MAC address of the first terminal. This is not specifically limited in this embodiment of this application.

Optionally, in this embodiment of this application, if a DHCP server is not integrated into the UPF entity, after receiving the DHCP request from the first terminal, the UPF entity may send the DHCP request to a device into which the DHCP server is integrated, and the device into which the DHCP server is integrated parses out the MAC address of the first terminal in the DHCP request, allocates an IP address for the first terminal, and then sends the addressing information of the first terminal to the UPF entity, and the UPF entity establishes, based on the correspondence 5 and the addressing information of the first terminal, the correspondence between the identifier of the MLAN to which the first terminal subscribes, the information about the downlink path corresponding to the first terminal, and the addressing information of the first terminal. This is not specifically limited in this embodiment of this application.

For example, assuming that a DHCP server is integrated into the SMF entity, after receiving the DHCP request from the first terminal, the UPF entity may send the DHCP request to the SMF entity, the SMF entity parses out the MAC address of the first terminal in the DHCP request, allocates an IP address for the first terminal, and sends the addressing information of the first terminal to the UPF entity, and the UPF entity establishes, based on the correspondence 5 and the addressing information of the first terminal, the correspondence between the identifier of the MLAN to which the first terminal subscribes, the information about the downlink path corresponding to the first terminal, and the addressing information of the first terminal. The SMF entity may alternatively send a DHCP response to the first terminal through the UPF entity, where the DHCP response carries the IP address of the first terminal. This is not specifically limited in this embodiment of this application.

For related description of the correspondence between the identifier of the MLAN to which the first terminal subscribes, the information about the downlink path corresponding to the first terminal, and the addressing information of the first terminal, refer to the description of the correspondence 2 in the embodiment shown in FIG. 4A, FIG. 4B, and FIG. 4C. Details are not described herein again.

Steps S501b to S512b are similar to steps S501a to S512a. A difference lies in that in steps S501b to S512b, the first terminal in steps S501a to S512a is replaced with a second terminal, and the first AN device is replaced with a second AN device. For details, refer to steps S501a to S512a. Details are not described herein again.

In step S509b, a correspondence that is between an identifier of an MLAN to which the second terminal subscribes, information about an uplink path corresponding to the second terminal, and information about a downlink path corresponding to the second terminal and that is established by the UPF entity may be recorded as a correspondence 6, and is shown in Table 10.

TABLE 10

| Identifier of an MLAN to which a second terminal subscribes | Information about a downlink path corresponding to the second terminal | Information about an uplink path corresponding to the second terminal |
| --- | --- | --- |

Steps S513 to S520 are similar to steps S411 to S418. For details, refer to the embodiment shown in FIG. 4A, FIG. 4B, and FIG. 4C. Details are not described herein again.

A difference between this embodiment and the embodiment shown in FIG. 4A, FIG. 4B, and FIG. 4C lies in that in the embodiment shown in FIG. 4A, FIG. 4B, and FIG. 4C, the addressing information of the first terminal in the correspondence 2 is obtained during a process in which the first terminal establishes an MLAN session. The addressing information of the second terminal in the correspondence 4 is obtained during a process in which an MLAN session is established for the second terminal. However, in the embodiment shown in FIG. 5A, FIG. 5B, FIG. 5C, and FIG. 5D, the addressing information of the first terminal in the correspondence 2 is obtained during a DHCP procedure initiated by the first terminal, and the addressing information of the second terminal in the correspondence 4 is obtained during a DHCP procedure initiated by the second terminal.

According to the data transmission method provided in this embodiment of this application, after receiving the data packet from the first terminal through the uplink path corresponding to the first terminal, the UPF entity can determine, based on the information about the uplink path corresponding to the first terminal and the addressing information of the second terminal, the downlink path corresponding to the second terminal, and can further send the data packet to the second terminal through the downlink path corresponding to the second terminal; alternatively, after receiving the data packet from the second terminal through the uplink path corresponding to the second terminal, the UPF entity can determine, based on the information about the uplink path corresponding to the second terminal and the addressing information of the first terminal, the downlink path corresponding to the first terminal, and can further send the data packet to the first terminal through the downlink path corresponding to the first terminal. Therefore, when two terminals correspond to a same UPF entity, the two terminals can locally interact with each other. For example, when two terminals that access a same MLAN correspond to a same UPF entity, the two terminals can locally interact with each other in the MLAN.

An action of the UPF entity in the foregoing steps S501a to S520 may be performed by the processor 301 in the communications device 300 shown in FIG. 3 invoking application program code stored in the memory 303. No limitation is imposed thereto in this embodiment of this application.

Figure 6:
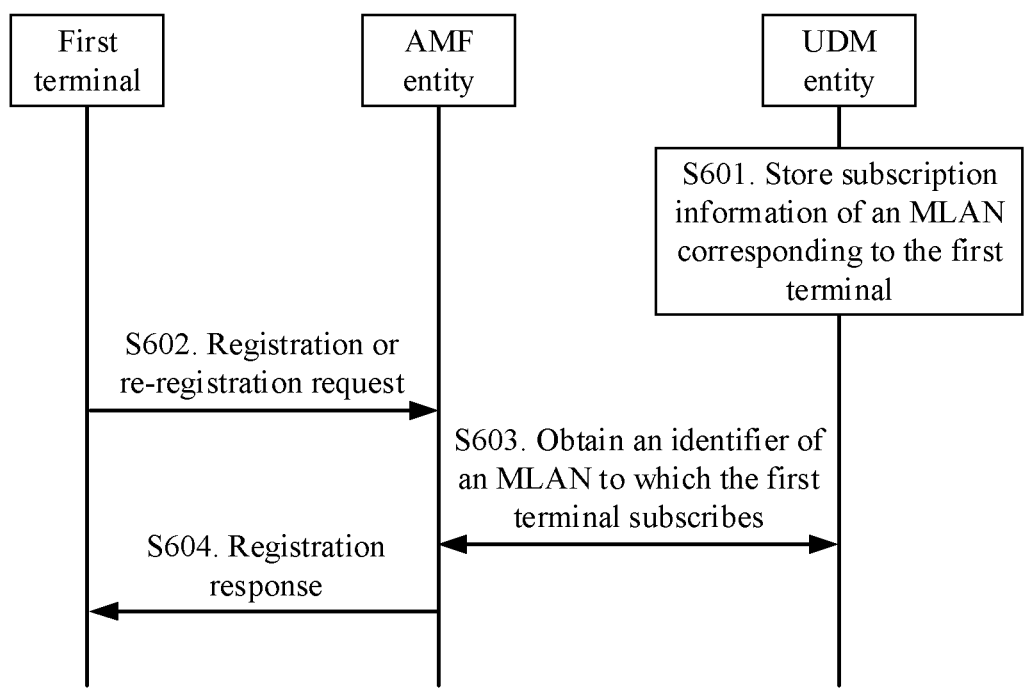
FIG. 6 is a schematic flowchart of a configuration method of an identifier of an MLAN according to an embodiment of this application.

The following is described by using an example in which an identifier of an MLAN to which a first terminal subscribes is configured on the first terminal. FIG. 6 is a schematic flowchart of a configuration process of an identifier of an MLAN, and the procedure includes the following steps.

S601. When the first terminal subscribes an MLAN service, a UDM entity stores subscription information of the MLAN corresponding to the first terminal, where the subscription information of the MLAN corresponding to the first terminal includes the identifier of the MLAN to which the first terminal subscribes.

Optionally, if the identifier of the MLAN to which the first terminal subscribes corresponds to a specific service scope, the subscription information of the MLAN of the first terminal may further include information about a specific service area corresponding to the identifier of the MLAN to which the first terminal subscribes.

The information about the specific service area corresponding to the identifier of the MLAN to which the first terminal subscribes may be alternatively configured on another network device. For example, the information about the specific service area corresponding to the identifier of the MLAN to which the first terminal subscribes is configured on one or more devices of a PCF entity, an AMF entity, and an SMF entity, so that when the first terminal initiates an MLAN session establishment procedure, these network devices can determine, based on a current location of the first terminal and the information about the specific service area corresponding to the identifier of the MLAN to which the first terminal subscribes, whether the first terminal is in the specific service area corresponding to the identifier of the MLAN to which the first terminal subscribes. This is not specifically limited in this embodiment of this application.

S602. The first terminal sends a registration or re-registration request to an AMF entity, so that the AMF entity receives the registration or re-registration request from the first terminal.

S603. The AMF entity obtains, from the UDM entity, the identifier of the MLAN to which the first terminal subscribes.

Optionally, if the identifier of the MLAN to which the first terminal subscribes corresponds the specific service scope, and the information about the specific service area corresponding to the identifier of the MLAN to which the first terminal subscribes is not configured on the AMF entity, the AMF entity further obtains, from a device on which the information about the specific service area corresponding to the identifier of the MLAN to which the first terminal subscribes is configured, for example, the UDM entity, the PCF entity, or the SMF entity, the information about the specific service area corresponding to the identifier of the MLAN to which the first terminal subscribes. This is not specifically limited in this embodiment of this application.

S604. The AMF entity sends a registration response to the first terminal, so that the first terminal receives the registration response from the AMF entity, where the registration response carries the identifier of the MLAN to which the first terminal subscribes.

Optionally, in this embodiment of this application, after the AMF entity obtains, from the UDM entity, the identifier of the MLAN to which the first terminal subscribes, if the identifier of the MLAN to which the first terminal subscribes corresponds to the specific service scope, the AMF entity needs to determine, based on information about a current registration area of the first terminal and the information about the specific service area corresponding to the identifier of the MLAN to which the first terminal subscribes, whether the current registration area of the first terminal overlaps the specific service area corresponding to the identifier of the MLAN to which the first terminal subscribes; if the current registration area of the first terminal overlaps the specific service area corresponding to the identifier of the MLAN to which the first terminal subscribes, the AMF entity sends a registration response to the first terminal, where the registration response carries the identifier of the MLAN to which the first terminal subscribes. Optionally, in this case, the registration response may further include the information about the specific service area corresponding to the identifier of the MLAN to which the first terminal subscribes, so that the first terminal can initiate, based on the information about the specific service area corresponding to the identifier of the MLAN to which the first terminal subscribes, an MLAN session establishment procedure in the specific service area corresponding to the identifier of the MLAN to which the first terminal subscribes. This is not specifically limited in this embodiment of this application.

In this case, the first terminal can obtain the identifier of the MLAN to which the first terminal subscribes, and can subsequently initiate an MLAN session establishment procedure based on the identifier of the MLAN to which the first terminal subscribes. For details, refer to the embodiment shown in FIG. 4A, FIG. 4B, and FIG. 4C or FIG. 5A, FIG. 5B, FIG. 5C, and FIG. 5D. Details are not described herein again.

In addition, for a procedure in which an identifier of an MLAN to which a second terminal subscribes is configured on the second terminal, refer to the foregoing procedure in which the identifier of the MLAN to which the first terminal subscribes is configured on the first terminal. Details are not described herein again.

Figure 10A:
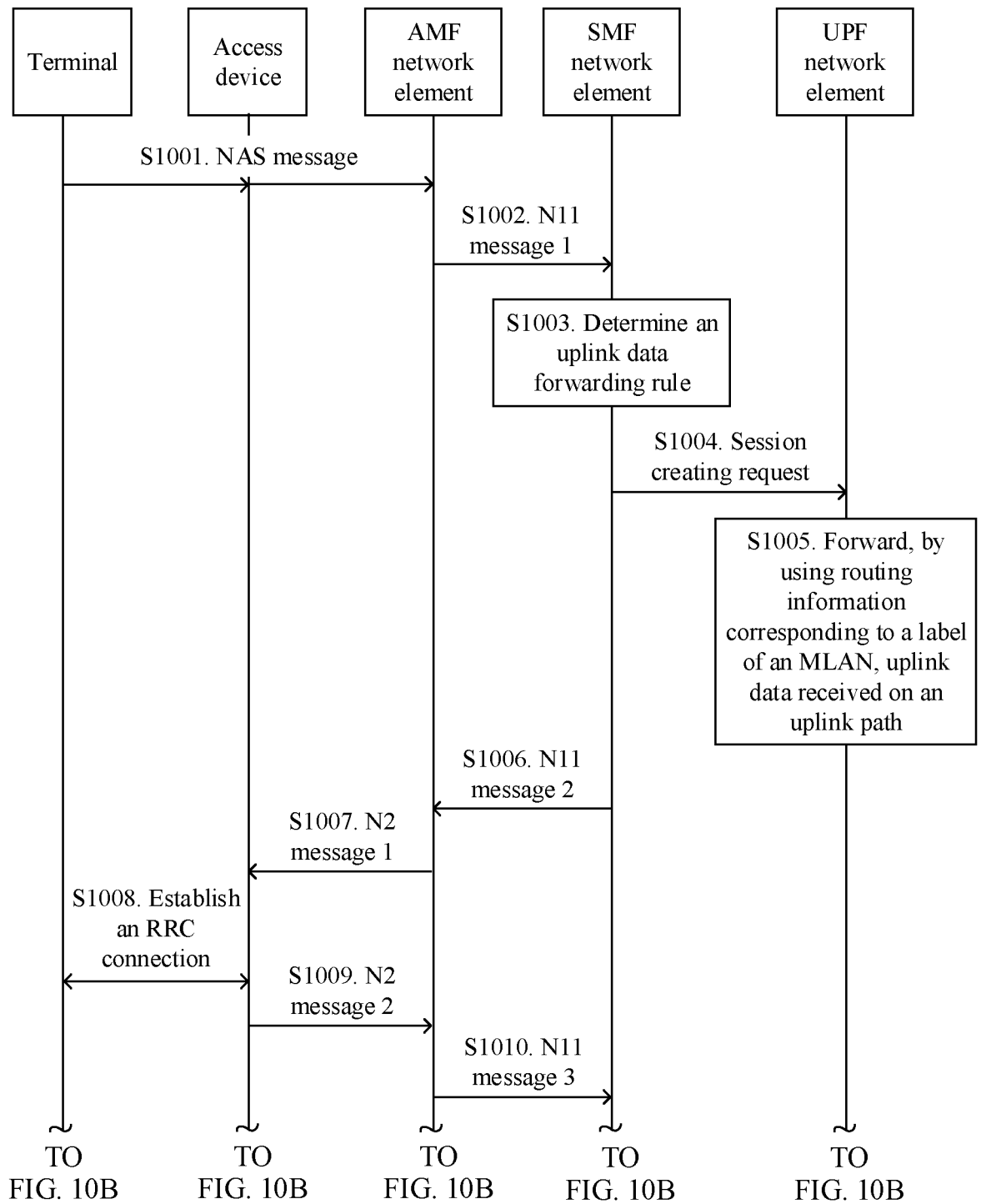
FIG. 10A and FIG. 10B are a schematic flowchart 3 of a data transmission method according to an embodiment of this application.
Figure 10B:
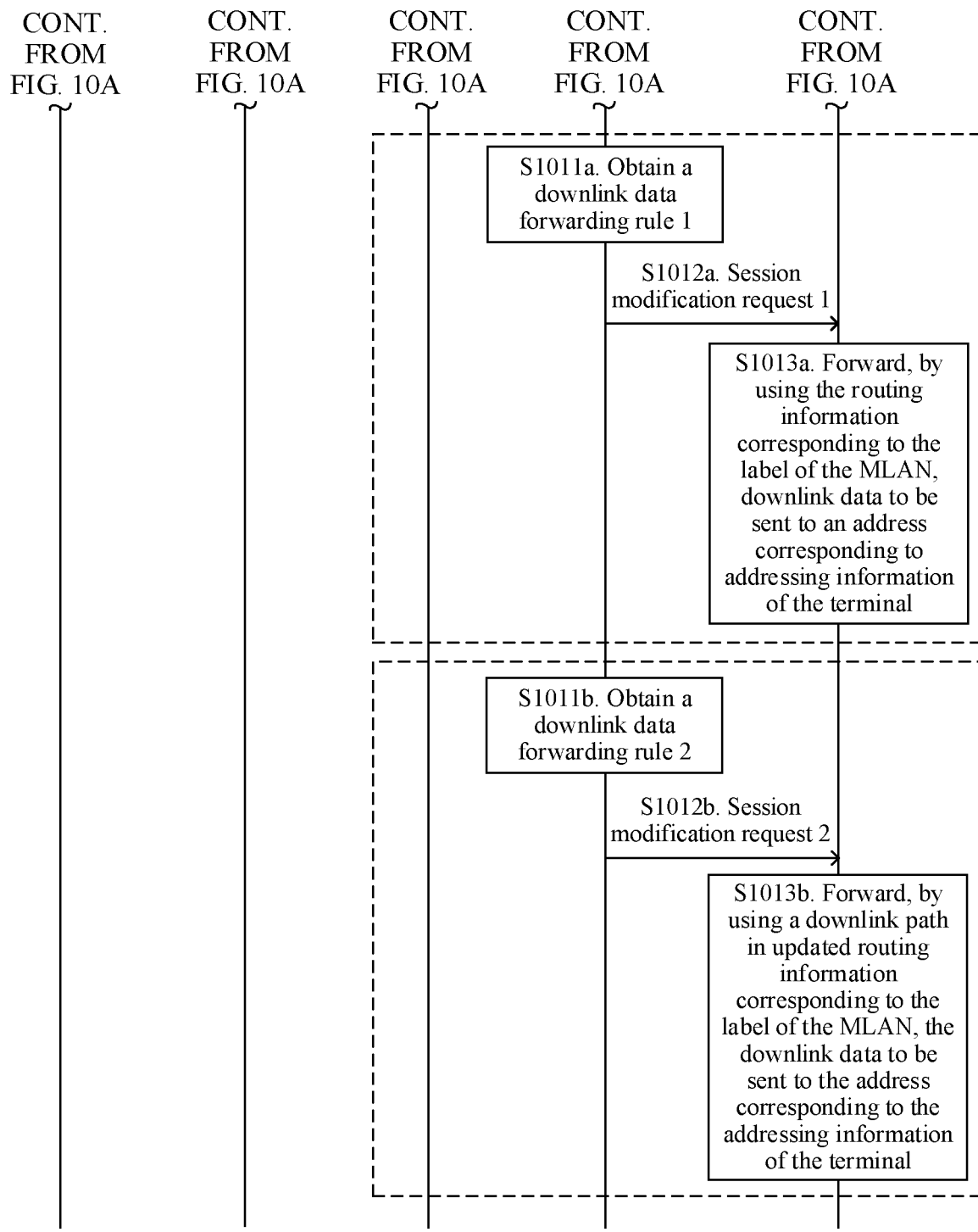

Optionally, assuming that the data transmission system shown in FIG. 9 is applied to the 5G network shown in FIG. 2, a data transmission method provided in an embodiment of this application may be shown in FIG. 10A and FIG. 10B, and includes the following steps.

S1001. A terminal sends a non-access stratum (NAS) message to an AMF network element through an access device, so that the AMF network element receives the NAS message from the terminal.

The NAS message includes a session establishment request, the session establishment request is used to request to establish a session for the terminal, and the session may be, for example, a PDU session. This is described herein for once, and details are not described below again.

In a possible implementation, the NAS message may include an identifier of an MLAN associated with the session for the terminal. The "association" herein may be alternatively understood as "belonging" or "corresponding", for a purpose of sending data of the terminal into the MLAN by using the session.

In another possible implementation, the session establishment request in the NAS message may include the identifier of the MLAN associated with the session for the terminal. This is not specifically limited in this embodiment of this application.

The identifier of the MLAN in this embodiment of this application is used to indicate a 5G MLAN associated with the session, or may be considered as identifying a subscriber group using an MLAN service. If the terminal subscribes to a specific MLAN, the terminal can use a service provided by the MLAN. This is described herein for once, and details are not described below again.

In this embodiment of this application, the identifier of the MLAN may be a data network name (DNN), a fully qualified domain name (FQDN), a character string, a sequence number, an internal group identifier, an external group identifier, or the like. This is not specifically limited in this embodiment of this application.

In addition, the NAS message in this embodiment of this application may further include an identifier of the session for the terminal. For details, refer to an existing implementation. Details are not described herein.

S1002. An AMF network element sends an N11 message 1 to the SMF network element, so that the SMF network element receives the N11 message 1 from the AMF network element.

The N11 message 1 includes an identifier of the terminal and the session establishment request. The identifier of the terminal is determined after the AMF network element receives the NAS message from the terminal, and is used to indicate a terminal that initiates the NAS message. For details, refer to an existing implementation. Details are not described herein.

In addition, when the session establishment request does not include an identifier of an MLAN, the N11 message 1 further includes the identifier of the MLAN in the NAS message. This is described herein for once, and details are not described below again.

In addition, if the NAS message in step S1001 further includes the identifier of the session for the terminal, the N11 message 1 may further include the identifier of the session for the terminal. For details, refer to an existing implementation. Details are not described herein.

Optionally, if the NAS message in step S1001 includes the identifier of the MLAN, after receiving the identifier of the MLAN, the AMF network element may verify whether the terminal subscribes to an MLAN or subscriber group corresponding to the identifier of the MLAN, and may select a corresponding SMF network element based on the identifier of the MLAN. This is not specifically limited in this embodiment of this application.

S1003. The SMF network element determines an uplink data forwarding rule based on the identifier of the MLAN, where the uplink data forwarding rule includes a label of the MLAN and information about an uplink path corresponding to the session.

The identifier of the MLAN may be obtained in the N11 message 1, or may be obtained in the session establishment request in the N11 message 1. This is not specifically limited in this embodiment of this application.

Optionally, the label of the MLAN in this embodiment of this application may be, for example, a network instance identifier, a virtual local area network (VLAN) identifier (VID), an identifier of an MLAN, or the like. This is not specifically limited in this embodiment of this application. The label of the MLAN may be used to identify an instance of the MLAN, or may be used to recognize, encapsulate, or identify data in the MLAN. The label of the MLAN may exist in tunnel information, terminal data, configuration data, or the like, and is mainly used to isolate communication between MLANs.

Optionally, in this embodiment of this application, that the SMF network element determines the uplink data forwarding rule based on the identifier of the MLAN may include that the SMF network element obtains the label of the MLAN based on the identifier of the MLAN; allocates, for the terminal, the information about the uplink path corresponding to the session; and generates the uplink data forwarding rule based on the label of the MLAN and the information about the uplink path corresponding to the session.

Optionally, in this embodiment of this application, if the identifier of the MLAN is used to identify a subscriber group using an MLAN service, the label of the MLAN may be a label of an MLAN to which a terminal in the subscriber group subscribes. This is described herein for once, and details are not described below again.

Optionally, in this embodiment of this application, the information about the uplink path corresponding to the session may be, for example, a tunnel identifier of a UPF network element that is allocated for the session, where the tunnel identifier may be, for example, a TEID. For details, refer to the description of the beginning part of the description of embodiments. Details are not described herein again.

Optionally, in this embodiment of this application, the SMF network element may obtain the label of the MLAN based on the identifier of the MLAN in the following manner.

In a possible implementation, the SMF network element may obtain subscription data of the MLAN of the terminal from a UDM network element based on the identifier of the MLAN, where the subscription data includes the label of the MLAN. Optionally, the subscription data may further include addressing information of the terminal and a quality of service (QoS) parameter related to the MLAN, for example, a session-aggregate maximum bit rate (AMBR), a 5G QoS indicator (5QI), or the like. This is not specifically limited in this embodiment of this application. In this embodiment of this application, the addressing information of the terminal may be allocated by the SMF network element, or obtained from a third party, for example, a DHCP server, or an MLAN address management function entity. For details, refer to the foregoing method embodiment. This is not specifically limited in this embodiment of this application.

In another possible implementation, the SMF network element may obtain, based on the identifier of the MLAN, authentication data of the MLAN of the terminal from another network element, for example, a management entity of the MLAN or a data network-authentication-authorization-accounting (DN-AAA) server, where the authentication data includes the label of the MLAN. This is not specifically limited in this embodiment of this application.

In another possible implementation, the SMF network element may allocate the label of the MLAN for the session based on the identifier of the MLAN; alternatively, the SMF network element pre-stores a correspondence between an identifier of an MLAN and a label of the MLAN, so that the SMF network element can determine the label of the MLAN based on the identifier of the MLAN and the correspondence. This is not specifically limited in this embodiment of this application.

In another possible implementation, the SMF network element may determine the identifier of the MLAN as the label of the MLAN. This is not specifically limited in this embodiment of this application.

Optionally, in this embodiment of this application, the SMF network element may alternatively obtain policy data of the terminal from a PCF network element based on the identifier of the MLAN, where the policy data may include a filter, an adjusted QoS parameter, or the like. The filter may be alternatively generated by the SMF network element based on information such as an address of the terminal, a local policy, and the like. This is not specifically limited in this embodiment of this application.

Optionally, in this embodiment of this application, the SMF network element may alternatively select a UPF network element based on the identifier of the MLAN. This is not specifically limited in this embodiment of this application.

S1004. The SMF network element sends a session creating request to the UPF network element, so that the UPF network element receives the session creating request from the SMF network element.

The session creating request includes the uplink data forwarding rule, and the uplink data forwarding rule is used to instruct the UPF network element to forward, by using routing information corresponding to the label of the MLAN, uplink data received on the uplink path.

Optionally, in this embodiment of this application, the routing information corresponding to the label of the MLAN may specifically include a destination address and a next-hop path. This is not specifically limited in this embodiment of this application.

Optionally, in this embodiment of this application, the session creating request may further include an N4 session identifier obtained through mapping of the identifier of the session. For details, refer to an existing implementation. Details are not described herein.

S1005. The UPF network element forwards, based on the uplink data forwarding rule by using the routing information corresponding to the label of the MLAN, the uplink data received on the uplink path.

For example, if the information about the uplink path corresponding to the session is a TEID 1, and the label of the MLAN is a label 1, the UPF network element may learn of, based on the TEID 1, a specific session to which received data belongs, and a next-hop path of the data of the session is determined by using routing information related to the label 1. If assuming that a current terminal is a terminal 1, a target address of the data of the session is an address of a terminal 2, and a next-hop path in the routing information related to the label 1 is a path 1, the UPF network element may forward, by using the path 1, uplink data that is received on the uplink path corresponding to the TEID 1 and whose destination address is the address of the terminal 2. Alternatively, assuming that when a current terminal is a terminal 1, a target address of data of the session is an address of a terminal 3, and a next-hop path in the routing information related to the label 1 is a path 2, the UPF network element may forward, by using the path 2, uplink data that is received on the uplink path corresponding to the TEID 1 and whose destination address is the address of the terminal 3, and so on.

S1006. The SMF network element sends an N11 message 2 to the AMF network element, so that the AMF network element receives the N11 message 2 from the SMF network element.

S1007. The AMF network element sends an N2 message 1 to the access device, so that the access device receives the N2 message 1 from the AMF network element.

S1008. The access device establishes a Radio Resource Control (RRC) connection to the terminal.

S1009. The access device sends an N2 message 2 to the AMF network element, so that the AMF network element receives the N2 message 2 from the access device.

S1010. The AMF network element sends an N11 message 3 to the SMF network element, so that the SMF network element receives the N11 message 3 from the AMF network element.

Optionally, steps S1006 to S1010 are performed, so that the QoS parameter can be configured on the terminal, and the information about the uplink path is configured on the access device, and information that is about a downlink path and that is allocated by the access device for the session may be obtained at the same time, where the information about the downlink path may include, for example, a tunnel identifier of the access device that is allocated for the session, the tunnel identifier may be, for example, a TEID. For details, refer to the description of the beginning part of the description of embodiments. Details are not described herein again. For an implementation related to the foregoing steps S1006 to S1010, refer to an existing implementation. Details are not described herein again.

Further, the data transmission method provided in this embodiment of this application may further include the following steps S1011a to S1013a, or the following steps S1011b to S1013b.

Steps S1011a to S1013a may include:

S1011a. The SMF network element obtains a downlink data forwarding rule 1, where the downlink data forwarding rule 1 includes the label of the MLAN and the addressing information of the terminal.

The label of the MLAN and the addressing information of the terminal may be obtained in the foregoing step S1003. Details are not described herein again.

S1012a. The SMF network element sends a session modification request 1 to the UPF network element, so that the UPF network element receives the session modification request 1 from the SMF network element.

The session modification request 1 includes the downlink data forwarding rule 1, the downlink data forwarding rule 1 is used to instruct the UPF network element to forward, by using the routing information corresponding to the label of the MLAN, downlink data to be sent to an address corresponding to the addressing information of the terminal.

Optionally, in this embodiment of this application, the session modification request 1 may further include an N4 session identifier obtained through mapping of the identifier of the session. For details, refer to an existing implementation. Details are not described herein again.

S1013a. The UPF network element forwards, based on the downlink data forwarding rule 1 by using the routing information corresponding to the label of the MLAN, the downlink data to be sent to the address corresponding to the addressing information of the terminal.

For example, if the addressing information of the terminal is an address 1, the label of the MLAN is a label 2, the UPF network element may learn of, based on the addressing information of the terminal, a specific session to which received data belongs, where a next-hop path of the data of the session is determined by using routing information related to the label 2. For example, assuming that a current terminal is a terminal 1, the addressing information is an address 1, and a next-hop path in the routing information related to the label 2 is a path 3, the UPF network element may forward, by using the path 3, downlink data to be sent to a destination address of the terminal 1, namely the address 1.

Steps S1011b to S1013b may include:

S1011b. The SMF network element obtains a downlink data forwarding rule 2, where the downlink data forwarding rule 2 includes the label of the MLAN, the addressing information of the terminal, and information about a downlink path corresponding to the session.

The label of the MLAN and the addressing information of the terminal may be obtained in the foregoing step S1003. The information about the downlink path corresponding to the session may be sent to the SMF network element in steps S1009 and S1010. Details are not described herein again.

S1012b. The SMF network element sends a session modification request 2 to the UPF network element, so that the UPF network element receives the session modification request 2 from the SMF network element.

The session modification request 2 includes the downlink data forwarding rule 2, the downlink data forwarding rule 2 is used to instruct the UPF network element to update the routing information corresponding to the label of the MLAN, and forward, by using the downlink path in updated routing information corresponding to the label of the MLAN, downlink data to be sent to an address corresponding to the addressing information of the terminal.

Optionally, in this embodiment of this application, the session modification request 2 may further include an N4 session identifier obtained through mapping of the identifier of the session. For details, refer to an existing implementation. Details are not described herein again.

S1013b. The UPF network element updates, based on the downlink data forwarding rule 2, the routing information corresponding to the label of the MLAN, and forwards, by using the downlink path in the updated routing information corresponding to the label of the MLAN, the downlink data to be sent to the address corresponding to the addressing information of the terminal.

In this embodiment of this application, the updated routing information corresponding to the label of the MLAN may specifically include that the information about the downlink path corresponding to the session is added to the routing information corresponding to the label of the MLAN, so that the UPF network element can forward, by using the downlink path in the updated routing information corresponding to the label of the MLAN, the downlink data to be sent to the address corresponding to the addressing information of the terminal. For a related example in which the UPF network element forwards, by using the downlink path in the updated routing information corresponding to the label of the MLAN, the downlink data to be sent to the address corresponding to the addressing information of the terminal, refer to step S1013a. Details are not described herein again.

According to the data transmission method provided in this embodiment of this application, when two terminals correspond to a same user plane function network element, the two terminals can locally interact with each other. For related analysis on technical effects, refer to the data transmission system part shown in FIG. 9. Details are not described herein again.

An action of the SMF network element in the foregoing steps S1001a to S1013a, in the foregoing steps S1001 to S1013b may be performed by the processor 301 in the communications device 300 shown in FIG. 3 invoking application program code stored in the memory 303. No limitation is imposed thereto in this embodiment of this application.

The foregoing mainly describes the solutions provided in the embodiments of this application from a perspective of interaction between network elements. It may be understood that, to implement the foregoing functions, the user plane function entity and the mobility management entity include a corresponding hardware structure and/or software module for performing each function. A person skilled in the art should readily appreciate that this application can be implemented in a form of hardware or in a form of a combination of hardware and computer software with reference to units and algorithm steps of examples described in the embodiments disclosed in this specification. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Division of function modules may be performed on the user plane function entity and the mobility management entity according to the foregoing method examples in the embodiments of this application. For example, each of the function modules may be divided in correspondence to each function, or two or more functions may be integrated into one processing module. The integrated module may be implemented in a form of hardware, or may be implemented in a form of a software function module. It should be noted that the division of the modules in the embodiments of this application is an example, and is merely logical function division, and there may be another division manner during actual implementation.

Figure 7:
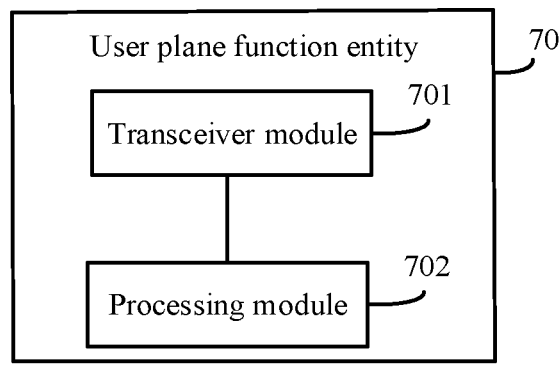
FIG. 7 is a schematic structural diagram of a user plane function entity according to an embodiment of this application.

For example, in a case in which the function modules are divided in an integrated manner, FIG. 7 shows a schematic structural diagram of a user plane function entity 70 in the foregoing embodiments. The user plane function entity 70 includes a transceiver module 701 and a processing module 702. The transceiver module 701 is configured to receive a data packet from a first terminal through an uplink path corresponding to the first terminal, where the data packet carries addressing information of a second terminal. The processing module 702 is configured to determine, based on information about the uplink path corresponding to the first terminal and the addressing information of the second terminal, a downlink path corresponding to the second terminal. The transceiver module 701 is further configured to send the data packet to the second terminal through the downlink path corresponding to the second terminal.

Optionally, the processing module 702 is configured to: determine, based on the information about the uplink path corresponding to the first terminal, an identifier of an MLAN to which the first terminal subscribes; and determine, based on the identifier of the MLAN and the addressing information of the second terminal, the downlink path corresponding to the second terminal.

Optionally, that the processing module 702 determines, based on information about the uplink path corresponding to the first terminal, an identifier of an MLAN to which the first terminal subscribes includes: determining, based on the information about the uplink path corresponding to the first terminal and a first correspondence, the identifier of the MLAN to which the first terminal subscribes, where the first correspondence includes a correspondence between the information about the uplink path corresponding to the first terminal and the identifier of the MLAN.

Optionally, that the processing module 702 determines, based on the identifier of the MLAN and the addressing information of the second terminal, the downlink path corresponding to the second terminal includes: determining, based on the identifier of the MLAN, the addressing information of the second terminal, and a second correspondence, the downlink path corresponding to the second terminal, where the second correspondence includes a correspondence between information about the downlink path corresponding to the second terminal, the addressing information of the second terminal, and the identifier of the MLAN.

Optionally, the processing module 702 is further configured to obtain the addressing information of the second terminal, where the addressing information of the second terminal includes an IP address of the second terminal, or a MAC address of the second terminal.

Optionally, the addressing information of the second terminal includes the IP address of the second terminal; and that the processing module 702 obtains the addressing information of the second terminal includes: receiving the IP address of the second terminal from a session management function entity, where the IP address of the second terminal is determined based on the identifier of the MLAN.

Optionally, the addressing information of the second terminal includes the MAC address of the second terminal; and that the processing module 702 obtains the addressing information of the second terminal includes: receiving the MAC address of the second terminal from the second terminal during an MLAN session establishment process.

Optionally, the addressing information of the second terminal includes the MAC address of the second terminal; and that the processing module 702 obtains the addressing information of the second terminal includes: receiving a DHCP request from the second terminal through an uplink path of the second terminal, where the DHCP request carries the MAC address of the second terminal; sending the DHCP request to the session management function entity; and receiving the MAC address of the second terminal from the session management function entity.

Optionally, the addressing information of the second terminal includes the MAC address of the second terminal; and that the processing module 702 obtains the addressing information of the second terminal includes: receiving a DHCP request from the second terminal through an uplink path of the second terminal, where the DHCP request carries the MAC address of the second terminal; and parsing the DHCP request, to obtain the MAC address of the second terminal.

Optionally, the processing module 702 is further configured to obtain an identifier of an MLAN to which the second terminal subscribes and the information about the downlink path corresponding to the second terminal; and the processing module 702 is further configured to establish the second correspondence based on the identifier of the MLAN, the addressing information of the second terminal, and the information about the downlink path corresponding to the second terminal.

Optionally, the processing module 702 is further configured to: before the transceiver module 701 receives the DHCP request from the second terminal through the uplink path corresponding to the second terminal, obtain the information about the uplink path corresponding to the second terminal, the identifier of the MLAN to which the second terminal subscribes, and the information about the downlink path corresponding to the second terminal; the processing module 702 is further configured to establish a third correspondence based on the information about the uplink path corresponding to the second terminal, the information about the downlink path corresponding to the second terminal, and the identifier of the MLAN, where the third correspondence includes a correspondence between the information about the uplink path corresponding to the second terminal, the information about the downlink path corresponding to the second terminal, and the identifier of the MLAN; and the processing module 702 is further configured to: after the transceiver module 701 receives the DHCP request from the second terminal through the uplink path corresponding to the second terminal, establish the second correspondence based on the third correspondence and the MAC address of the second terminal.

Optionally, the processing module 702 is further configured to obtain the identifier of the MLAN to which the first terminal subscribes and the information about the uplink path corresponding to the first terminal; and the processing module 702 is further configured to establish the first correspondence based on the identifier of the MLAN and the information about the uplink path corresponding to the first terminal.

Optionally, the information about the uplink path corresponding to the first terminal includes a tunnel identifier of a user plane function entity that is allocated for the first terminal; and the information about the downlink path corresponding to the second terminal includes a tunnel identifier of an access device that is allocated for the second terminal.

Reference may be made to the function descriptions of the corresponding function modules for all related content of each step in the foregoing method embodiment. Details are not described herein again.

In this embodiment, the user plane function entity 70 is presented in a form of dividing the function modules in an integrated manner. Herein, the "module" may be an application-specific integrated circuit (ASIC), a circuit, a processor that executes one or more software or firmware programs and a memory, an integrated logic circuit, and/or another component that can provide the foregoing functions. In a simple embodiment, a person skilled in the art may come up with an idea that the user plane function entity 70 may use a form shown in FIG. 3.

The processor 301 in FIG. 3 invokes a computer execution instruction stored in the memory 303, so that the user plane function entity 70 is enabled to perform the data transmission method provided in the foregoing method embodiment.

Functions/implementation processes of the transceiver module 701 and the processing module 702 in FIG. 7 may be implemented by the processor 301 in FIG. 3 invoking the computer execution instruction stored in the memory 303. Alternatively, functions/implementation processes of the processing module 702 in FIG. 7 may be implemented by the processor 301 in FIG. 3 invoking the computer execution instruction stored in the memory 303. Functions/implementation processes of the transceiver module 701 in FIG. 7 may be implemented by the communications interface 304 in FIG. 3.

The user plane function entity in this embodiment of this application can be configured to perform the foregoing data transmission method. Therefore, for technical effects that can be obtained by the user plane function entity, refer to the foregoing method embodiment. Details are not described herein again.

Figure 8:
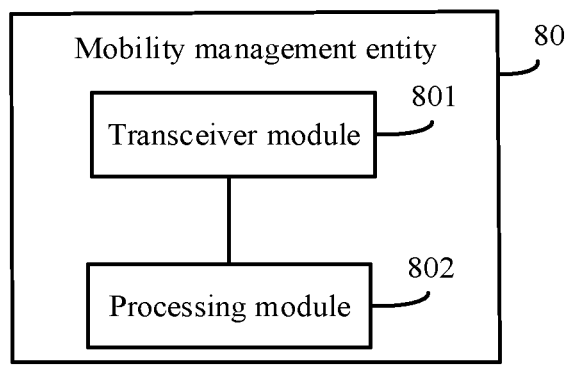
FIG. 8 is a schematic structural diagram of a mobility management entity according to an embodiment of this application.

For example, in a case in which the function modules are divided in an integrated manner, FIG. 8 shows a schematic structural diagram of a mobility management entity 80 in the foregoing embodiment. The mobility management entity 80 includes a transceiver module 801 and a processing module 702. The transceiver module 801 is configured to receive a registration or re-registration request from a terminal; the processing module 802 is configured to obtain, from a database entity, an identifier of an MLAN to which the terminal subscribes; and the transceiver module 801 is further configured to send the identifier of the MLAN to the terminal.

Optionally, the identifier of the MLAN is an identifier corresponding to a specific area; the transceiver module 801 is configured to: when the processing module 802 determines that a current registration area of the terminal overlaps the specific area, send the identifier of the MLAN to the terminal.

Optionally, the transceiver module 801 is further configured to receive the identifier of the MLAN from the terminal during an MLAN session establishment process, where the identifier of the MLAN is used to establish an MLAN session.

Reference may be made to the function descriptions of the corresponding function modules for all related content of each step in the foregoing method embodiment. Details are not described herein again.

In this embodiment, the mobility management entity 80 is presented in a form of dividing the function modules in an integrated manner. Herein, the "module" may be an application-specific integrated circuit (ASIC), a circuit, a processor that executes one or more software or firmware programs and a memory, an integrated logic circuit, and/or another component that can provide the foregoing functions. In a simple embodiment, a person skilled in the art may come up with an idea that the mobility management entity 80 may use a form shown in FIG. 3.

The processor 301 in FIG. 3 invokes a computer execution instruction stored in the memory 303, so that the mobility management entity 80 is enabled to perform the data transmission method in the foregoing method embodiment.

Functions/implementation processes of the transceiver module 801 and the processing module 802 in FIG. 8 may be implemented by the processor 301 in FIG. 3 invoking the computer execution instruction stored in the memory 303. Alternatively, functions/implementation processes of the processing module 802 in FIG. 8 may be implemented by the processor 301 in FIG. 3 invoking the computer execution instruction stored in the memory 303. Functions/implementation processes of the transceiver module 801 in FIG. 8 may be implemented by the communications interface 304 in FIG. 3.

The mobility management entity in this embodiment of this application can be configured to perform the foregoing data transmission method. Therefore, for technical effects that can be obtained by the mobility management entity, refer to the foregoing method embodiment. Details are not described herein again.

In the foregoing embodiment, the user plane function entity 70 and the mobility management entity 80 are presented in a form of dividing the function modules in an integrated manner. Division of function modules may be performed on the user plane function entity or the mobility management entity in correspondence to each function in this embodiment of this application. This is not specifically limited in this embodiment of this application.

Optionally, an embodiment of this application provides a chip system. The chip system includes a processor, where the processor is configured to support a user plane function entity in implementing the foregoing data transmission method, for example, determine, based on information about an uplink path corresponding to a first terminal and addressing information of a second terminal, a downlink path corresponding to the second terminal. In a possible design, the chip system further includes a memory. The memory is configured to store a program instruction and data that are necessary for the user plane function entity. The chip system may include a chip, or may include a chip and another discrete device. This is not specifically limited in this embodiment of this application.

Optionally, an embodiment of this application provides a chip system. The chip system includes a processor, where the processor is configured to support a mobility management entity in implementing the foregoing data transmission method, for example, obtain an identifier of an MLAN to which a terminal subscribes. In a possible design, the chip system further includes a memory. The memory is configured to store a program instruction and data that are necessary for the mobility management entity. The chip system may include a chip, or may include a chip and another discrete device. This is not specifically limited in this embodiment of this application.

Figure 11:
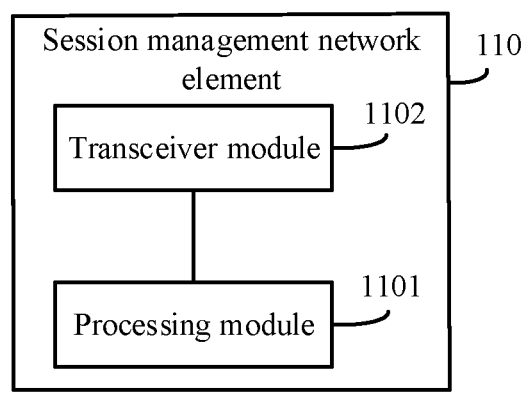
FIG. 11 is a schematic structural diagram of a session management network element according to an embodiment of this application.

For example, in a case in which the function modules are divided in an integrated manner, FIG. 11 shows a schematic structural diagram of a session management network element 110. The session management network element 110 includes a processing module 1101 and a transceiver module 1102. The processing module 1101 is configured to obtain an identifier of an MLAN associated with a session of a terminal; the processing module 1101 is further configured to determine an uplink data forwarding rule based on the identifier of the MLAN, where the uplink data forwarding rule includes a label of the MLAN and information about an uplink path corresponding to the session; and the transceiver module 1102 is configured to send the uplink data forwarding rule to a user plane network element, where the uplink data forwarding rule is used to instruct the user plane network element to forward, by using routing information corresponding to the label of the MLAN, uplink data received on the uplink path.

Optionally, that the processing module 1101 is configured to obtain an identifier of an MLAN associated with a session of a terminal means that the processing module 1101 is configured to receive a session establishment request from the terminal, where the session establishment request includes the identifier of the MLAN; or the session management network element receives a request message from a mobility management network element, where the request message includes the identifier of the MLAN.

Optionally, that the processing module 1101 is configured to determine an uplink data forwarding rule based on the identifier of the MLAN means that the processing module 1101 is configured to obtain the label of the MLAN based on the identifier of the MLAN; and generate the uplink data forwarding rule based on the label of the MLAN and the information that is about the uplink path corresponding to the session and that is allocated for the terminal.

Optionally, that the processing module 1101 is configured to obtain the label of the MLAN based on the identifier of the MLAN means that the processing module 1101 is configured to obtain, based on the identifier of the MLAN, subscription data of the MLAN of the terminal, where the subscription data includes the label of the MLAN; or obtain authentication data of the MLAN of the terminal based on the identifier of the MLAN, where the authentication data includes the label of the MLAN; or allocate the label of the MLAN based on the identifier of the MLAN; or determine the identifier of the MLAN as the label of the MLAN.

Optionally, the processing module 1101 is further configured to obtain a downlink data forwarding rule, where the downlink data forwarding rule includes the label of the MLAN and addressing information of the terminal; the transceiver module 1102 is further configured to send the downlink data forwarding rule to the user plane network element, where the downlink data forwarding rule is used to instruct the user plane network element to forward, by using routing information corresponding to the label of the MLAN, downlink data to be sent to an address corresponding to the addressing information of the terminal.

Optionally, the processing module 1101 is further configured to obtain a downlink data forwarding rule, where the downlink data forwarding rule includes the label of the MLAN, addressing information of the terminal, and information about a downlink path corresponding to the session; the transceiver module 1102 is further configured to send the downlink data forwarding rule to the user plane network element, where the downlink data forwarding rule is used to instruct the user plane network element to update the routing information corresponding to the label of the MLAN, and forward, by using the downlink path in updated routing information corresponding to the label of the MLAN, downlink data to be sent to an address corresponding to the addressing information of the terminal.

Reference may be made to the function descriptions of the corresponding function modules for all related content of each step in the foregoing method embodiment. Details are not described herein again.

In this embodiment, the session management network element 110 is presented in a form of dividing the function modules in an integrated manner. Herein, the "module" may be a specific ASIC, a circuit, a processor that executes one or more software or firmware programs and a memory, an integrated logic circuit, and/or another component that can provide the foregoing functions. In a simple embodiment, a person skilled in the art may come up with an idea that the session management network element 110 may use a form shown in FIG. 3.

For example, the processor 301 in FIG. 3 invokes a computer execution instruction stored in the memory 303, so that the session management network element 110 is enabled to perform the data transmission method in the foregoing method embodiments.

Functions/implementation processes of the processing module 1101 and the transceiver module 1102 in FIG. 11 may be implemented by the processor 301 in FIG. 3 invoking the computer execution instruction stored in the memory 303. Alternatively, functions/implementation processes of the processing module 1101 in FIG. 11 may be implemented by the processor 301 in FIG. 3 invoking the computer execution instruction stored in the memory 303. Functions/ implementation processes of the transceiver module 1102 in FIG. 11 may be implemented by the communications interface 304 in FIG. 3.

The session management network element 110 in this embodiment of this application can be configured to perform the foregoing data transmission method. Therefore, for technical effects that can be obtained by the session management network element 110, refer to the foregoing method embodiments. Details are not described herein again.

Optionally, an embodiment of this application further provides a chip system. The chip system includes a processor, where the processor is configured to support a session management network element in implementing the foregoing data transmission method, for example, determine an uplink data forwarding rule based on an identifier of an MLAN. In a possible design, the chip system further includes a memory. The memory is configured to store a program instruction and data that are necessary for the session management network element. The memory may not be in the chip system. The chip system may include a chip, or may include a chip and another discrete device. This is not specifically limited in this embodiment of this application.

The foregoing embodiments may be all or partially implemented by software, hardware, firmware or any combination thereof. When being implemented by a software program, the embodiments may be all or partially implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible to a computer, or a data storage device such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely exemplary description of this application defined by the accompanying claims, and considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data transmission method comprising:
   receiving, by a user plane network element, from a first terminal, and through an uplink path corresponding to the first terminal, a data packet comprising addressing information of a second terminal, wherein the first terminal and the second terminal subscribe to a same mobile local area network (MLAN) and correspond to a same user plane function entity;
   determining, by the user plane network element based on information about the uplink path, a label of the MLAN, wherein the information about the uplink path comprises a first tunnel identifier of the user plane function entity that is allocated for the first terminal;
   determining, by the user plane network element based on the label and the addressing information, information about a downlink path corresponding to the second terminal, wherein the information about the downlink path comprises a second tunnel identifier of an access device that is allocated for the second terminal; and sending, by the user plane network element, to the second terminal, through the downlink path, and based on the information about the downlink path , the data packet.

2. The method of claim 1, wherein determining the label comprises determining the label based on the information about the uplink path and a first correspondence, and wherein the first correspondence is between the information about the uplink path and the label.

3. The method of claim 1, wherein determining the information about the downlink path comprises determining the information about the downlink path based on the label and a second correspondence, wherein the second correspondence is among the information about the downlink path, the addressing information, and the label.

4. The method of claim 3, further comprising obtaining the addressing information, wherein the addressing information comprises an Internet Protocol (IP) address of the second terminal or a media access control (MAC) address of the second terminal.

5. The method of claim 4, wherein the addressing information comprises the MAC address, wherein obtaining the addressing information comprises receiving, from the second terminal during an MLAN session establishment process, the MAC address.

6. The method of claim 4, wherein the addressing information comprises the MAC address, and wherein obtaining the addressing information comprises:
receiving, from the second terminal through a second uplink path of the second terminal, a Dynamic Host Configuration Protocol (DHCP) request comprising the MAC address;
sending, to a session management function entity, the DHCP request; and
receiving, from the session management function entity, the MAC address.

7. The method of claim 4, wherein the addressing information comprises the MAC address, and wherein obtaining the addressing information comprises:
receiving, from the second terminal through a second uplink path of the second terminal, a Dynamic Host Configuration Protocol (DHCP) request comprising the MAC address; and
parsing the DHCP request to obtain the MAC address.

8. A user plane function entity comprising:
a storage medium configured to store instructions; and
at least one processor coupled to the storage medium and configured to execute the instructions to cause the user plane function entity to:
receive, from a first terminal through an uplink path corresponding to the first terminal, a data packet comprising addressing information of a second terminal, wherein the first terminal and the second terminal subscribe to a same mobile local area network (MLAN) and correspond to a same user plane function entity;
determine, based on information about the uplink path, a label of the MLAN , wherein the information about the uplink path comprises a first tunnel identifier of the user plane function entity that is allocated for the first terminal;
determine, based on the label and the addressing information, information about a downlink path corresponding to the second terminal, wherein the information about the downlink path comprises a second tunnel identifier of an access device that is allocated for the second terminal; and
send, to the second terminal, through the downlink path, and based on the information about the downlink path, the data packet.

9. The user plane function entity of claim 8, wherein the at least one processor is further configured to execute the instructions to cause the user plane function entity to determine the label by determining the label based on the information about the uplink path and a first correspondence, and wherein the first correspondence is between the information about the uplink path and the label.

10. The user plane function entity of claim 8, wherein the at least one processor is further configured to execute the instructions to cause the user plane function entity to determine the information about the downlink path by determining the information about the downlink path based on the label and a second correspondence, and wherein the second correspondence is among the information about the downlink path, the addressing information, and the label.

11. The user plane function entity of claim 10, wherein the at least one processor is further configured to execute the instructions to cause the user plane function entity to obtain the addressing information, wherein the addressing information comprises an Internet Protocol (IP) address of the second terminal or a media access control (MAC) address of the second terminal.

12. The user plane function entity of claim 11, wherein the addressing information comprises the MAC address, and wherein the at least one processor is further configured to execute the instructions to cause the user plane function entity to obtain the addressing information by receiving, from the second terminal during an MLAN session establishment process, the MAC address.

13. The user plane function entity of claim 11, wherein the addressing information comprises the MAC address, and wherein the at least one processor is further configured to execute the instructions to cause the user plane function entity to obtain the addressing information by:
receiving, from the second terminal through a second uplink path of the second terminal, a Dynamic Host Configuration Protocol (DHCP) request comprising the MAC address;
sending, to a session management function entity, the DHCP request; and
receiving, from the session management function entity, the MAC address.

14. The user plane function entity of claim 11, wherein the addressing information comprises the MAC address, and wherein the at least one processor is further configured to execute the instructions to cause the user plane function entity to obtain the addressing information by:
receiving, from the second terminal through a second uplink path of the second terminal, a Dynamic Host Configuration Protocol (DHCP) request comprising the MAC address; and
parsing the DHCP request to obtain the MAC address.

15. A computer program product comprising instructions that are stored on a non-transitory computer-readable medium and that, when run on an apparatus , cause the apparatus to perform as a user plane function entity to:
receive, from a first terminal through an uplink path corresponding to the first terminal, a data packet comprising addressing information of a second terminal, wherein the first terminal and the second terminal subscribe to a same mobile local area network (MLAN) and correspond to a same user plane function entity;

determine, based on information about the uplink path, a label of the MLAN, wherein the information about the uplink path comprises a first tunnel identifier of the user plane function entity that is allocated for the first terminal;

determine, based on the label and the addressing information, information about a downlink path corresponding to the second terminal, wherein the information about the downlink path comprises a second tunnel identifier of an access device that is allocated for the second terminal; and send, to the second terminal, through the downlink path, and based on the information about the downlink path, the data packet.

16. The computer program product of claim 15, wherein the instructions, when run on the apparatus, further causes the apparatus to perform as the user plane function entity to receive, from a session management network element, an uplink data forwarding rule and a downlink data forwarding rule, wherein the uplink data forwarding rule comprises the label and the information about the uplink path, and wherein the downlink data forwarding rule comprises the label, the information about the downlink path, and the addressing information.

17. The computer program product of claim 16, wherein the instructions, when run on the apparatus, further cause the apparatus to perform as the user plane function entity to:

determine the label by determining the label based on the information about the uplink path and the uplink data forwarding rule; and determine the information about the downlink path by determining the information about the downlink path based on the label, the addressing information. and the downlink data forwarding rule.

18. The method of claim 1, further comprising receiving, by the user plane network element and from a session management network element, an uplink data forwarding rule and a downlink data forwarding rule, wherein the uplink data forwarding rule comprises the label and the information about the uplink path, and wherein the downlink data forwarding rule comprises the label, the information about the downlink path and the addressing information.

19. The method of claim 18, wherein determining the label comprises determining the label based on the information about the uplink path and the uplink data forwarding rule, and wherein determining the information about the downlink path comprises determining the information about the downlink path based on the label, the addressing information, and the downlink data forwarding rule.

20. The user plane function entity of claim 8, wherein the at least one processor is further configured to execute the instructions to cause the user plane function entity to receive, from a session management network element, an uplink data forwarding rule and a downlink data forwarding rule, wherein the uplink data forwarding rule comprises the label and the information about the uplink path, and wherein the downlink data forwarding rule comprises the label, the information about the downlink path, and the addressing information.

21. The user plane function entity of claim 20, wherein the at least one processor is further configured to execute the instructions to cause the user plane function entity to:

determine the label by determining the label based on the information about the uplink path and the uplink data forwarding rule; and determine the information about the downlink path by determining the information about the downlink path based on the label, the addressing information, and the downlink data forwarding rule.

22. The user plane function entity of claim 8, wherein the label is a network instance identifier of the MLAN which is different from a data network name (DNN), and wherein the DNN identifies the MLAN.

* * * * *